(12) United States Patent
Hirotani et al.

(10) Patent No.: US 9,003,956 B2
(45) Date of Patent: Apr. 14, 2015

(54) FLUID CYLINDER MECHANISM

(75) Inventors: Kaoru Hirotani, Tochigi (JP); Darrell Quander, Medina, OH (US); Steven Reilly, Westlake, OH (US)

(73) Assignees: Honda Motor Co., Ltd., Tokyo (JP); Barnes Group Inc., Brecksville, OH (US)

( * ) Notice: Subject to any disclaimer, the term of this patent is extended or adjusted under 35 U.S.C. 154(b) by 887 days.

(21) Appl. No.: 13/164,852

(22) Filed: Jun. 21, 2011

(65) Prior Publication Data

US 2012/0325082 A1 Dec. 27, 2012

(51) Int. Cl.
| | |
|---|---|
| F15B 13/02 | (2006.01) |
| B21D 22/22 | (2006.01) |
| B21D 24/00 | (2006.01) |
| B30B 1/34 | (2006.01) |
| F16F 9/00 | (2006.01) |

(52) U.S. Cl.
CPC ............ *B21D 22/22* (2013.01); *B21D 24/00* (2013.01); *B30B 1/34* (2013.01); *F16F 9/00* (2013.01)

(58) Field of Classification Search
CPC .......... F16F 9/182; F16F 9/187; F15B 13/021
USPC ........... 92/181 P; 91/440; 267/119, 127, 124; 188/283, 322.15
See application file for complete search history.

(56) References Cited

U.S. PATENT DOCUMENTS

| | | | | |
|---|---|---|---|---|
| 4,756,680 | A * | 7/1988 | Ishii | 425/78 |
| 7,370,637 | B2 * | 5/2008 | Jay et al. | 123/467 |
| 2009/0311361 | A1 * | 12/2009 | Hirotani | 425/412 |
| 2010/0236881 | A1 * | 9/2010 | Browne et al. | 188/283 |

FOREIGN PATENT DOCUMENTS

| | | | | |
|---|---|---|---|---|
| DE | 3543291 A1 * | 6/1987 | | F16F 9/50 |
| JP | 2009-299795 | 12/2009 | | |

* cited by examiner

*Primary Examiner* — Nathaniel Wiehe
*Assistant Examiner* — Abiy Teka
(74) *Attorney, Agent, or Firm* — Rankin, Hill & Clark LLP

(57) ABSTRACT

A fluid cylinder mechanism (1) equipped with a cylinder (10) having a base end (12) and an open end (11), and a piston (20) having a flange portion (21) disposed inside the cylinder and a rod portion (25) that passes through the open end of the cylinder, in which a space inside the cylinder is partitioned by the flange portion of the piston into a first pressured chamber (14) on a side of the base end and a second pressurized chamber (15) on a side of the open end, is characterized by including: a first flow path (22) that permits flow of a fluid from the first pressurized chamber to the second pressurized chamber; a second flow path (32) that permits flow of the fluid from the second pressurized chamber to the first pressurized chamber; and an opening and closing means (35) for opening and closing the second flow path.

6 Claims, 20 Drawing Sheets

FLUID CYLINDER MECHANISM

BACKGROUND OF THE INVENTION

1. Field of the Invention

The present invention relates to a fluid cylinder mechanism. More specifically, the present invention relates to a fluid cylinder mechanism provided with a lock mechanism whereby the piston is locked in a state drawn into the cylinder.

2. Related Art

Conventionally, a fluid cylinder mechanism has been proposed in which the piston is locked in a state drawn into the cylinder (for example, refer to Japanese Unexamined Patent Application Publication No. 2009-299795).

Hereinafter, a conventional fluid cylinder mechanism 101 will be explained while referring to FIGS. 1 to 5.

The conventional fluid cylinder mechanism 101 has a sleeve 110 that is open at one end, a hollow piston rod 120, and a displacement piston rod 135.

A first chamber 114 holding operating air is formed inside the sleeve 110 by inserting a closure member 111 in the opening of the sleeve 110.

A shock-absorbing member 112 composed of urethane rubber is fixed to a ceiling surface of the sleeve 110.

A feed path 116 is formed in the sleeve 110 and the shock-absorbing member 112. Operating air is fed to the first chamber 114 via the feed path 116. A supply pipe 117 is inserted into the feed path 116 of the sleeve 110. A check valve 118 is provided at a leading end of the supply pipe 117. The escaping of operating air in the first chamber 114 to outside of the fluid cylinder mechanism 101 is avoided with this check valve 118.

The hollow piston rod 120 is configured by a cover member 127 being fit into a cylindrical body 125 having a flange portion 121, thereby forming a second chamber 126 inside. A seal member 124 is installed between a side wall of the flange portion 121 and the inside wall of the sleeve 110.

A plurality of first communication paths 133 communicating the first chamber 114 with the second chamber 126 are formed between the inner circumferential wall and the outer circumferential wall of the hollow piston rod 120.

A second communication path 134 communicating the first chamber 114 with the second chamber 126 is formed in the cover member 127 of the hollow piston rod 120. A check valve 123 is installed in the second communication path 124. This check valve 123 feeds operating air inside the first chamber 114 to the second chamber 126 by opening when the pressure of the first chamber 114 reaches a predetermined value.

An insertion hole 129 is formed in a bottom wall 128 of the hollow piston rod 120. A seat portion 141 of a ring shape is formed in the top surface of the bottom wall 128.

The displacement piston rod 135 has a disk portion 142 accommodated in the hollow piston rod 120, and a shaft portion 143 that extends from the disk portion 142. The shaft portion 143 is passed through the insertion hole 129. A bearing 131 is installed in the insertion hole 129, and serves as a seal between the insertion hole 129 and the shaft portion 143.

Packing 144 is attached to the side wall of the disk portion 142. The packing 144 slides in contact with the inside wall of the hollow piston rod 120 when the displacement piston rod 135 displaces.

When the displacement piston rod 135 is positioned at the bottom dead point in FIG. 1, the disk portion 142 is seated on the seat portion 141. As a result, a third chamber 145 is formed between the top surface of the bottom wall 128 and the disk portion 142.

A plurality of paths 146 extending along the height direction of the disk portion 142 are formed therein. The third chamber 145 and the second chamber 126 are in communication via the paths 146. The pressure of the second chamber 126 and the pressure of the third chamber 145 are, therefore, usually equal to each other.

In the conventional fluid cylinder mechanism 101 configured in the above way, the sleeve 110 is fixed at a side thereof at the shock-absorbing member 112 to the bottom surface of an upper mold 70 of a molding apparatus 50 described later, for example. On the other hand, the displacement piston rod 135 is positioned slightly above the top surface of a moveable mold 80 that moves vertically relative to the upper mold 70.

As shown in FIG. 1, the shaft portion 143 of the displacement piston rod 135 and the top surface of the moveable mold 80 are separated in an initial state.

At this time, the disk portion 142 of the displacement piston rod 135 is seated on the seat portion 141. The first chamber 114 and the second chamber 126 are in communication via the first communication paths 133, and the second chamber 126 and the third chamber 145 are in communication via the paths 146.

In this state, the first chamber 114, the second chamber 126 and the third chamber 145 are filled with operating air of a predetermined pressure.

As shown in FIG. 2, when the upper mold 70 and the moveable mold 80 operate in directions relatively approaching each other, and the shaft portion 143 of the displacement piston rod 135 immerses inwards into the hollow piston rod 120, the disk portion 142 of a displacement piston rod 135 blocks the first communication path 133.

Since there is no substantial change in the volumes of the first chamber 114, second chamber 126 and third chamber 145 at this time, the pressure of the operating air does not change.

As shown in FIG. 3, when the upper mold 70 and the moveable mold 80 further operate in directions relatively approaching each other, the hollow piston rod 120 rises relative to the sleeve 110, and the flange portion 121 rises relatively inside the sleeve 110. As a result, the height of the first chamber 114 contracts, and also a fourth chamber 147 is formed between the flange portion 121 and the closure member 111.

When the height of the first chamber 114 is contracting, the pressure of the first chamber 114 becomes higher than the pressure of the second chamber 126. If the pressure differential therebetween exceeds a predetermined value, the check valve 123 will open, and the pressure of the first chamber 114 will be bled off to the second chamber 126 and the third chamber 145, thereby eliminating the pressure differential therebetween. When the pressure differential has been eliminated, the check valve 123 closes.

The pressure of the first chamber 114 and the pressures of the second chamber 126 and the third chamber 145 gradually rise while assuming a substantially equal state, by repeating this operation.

As shown in FIG. 4, the upper mold 70 and the moveable mold 80 further operate in directions relatively approaching each other until the top surface of the flange portion 121 of the hollow piston rod 120 rises to a position (ascent limit position) substantially contacting the shock-absorbing member 112 of the sleeve 110.

At this time, the pressures of the first chamber 114 and the feed path 116 and the pressures of the second chamber 126 and the third chamber 145 are substantially equal, and in an extraordinarily high pressure state. The pressure of the fourth chamber 147 is nearly atmospheric pressure.

As shown in FIG. 5, when the upper mold 70 and the moveable mold 80 operate in directions relatively separating from each other from the state shown in FIG. 4, the force supporting the hollow piston rod 120 from below is lost. As a result, the hollow piston rod 120 descends relative to the sleeve 110.

Then, the pressure depressing the hollow piston rod 120 downward reduces, since the pressure of the first chamber 114 declines due to the hollow piston rod 120 descending. On the other hand, the pressure supporting the hollow piston rod 120 from below increases, since the pressure of the fourth chamber 147 rises due to the hollow piston rod 120 descending.

The hollow piston rod 120 is supported by the pressure of the fourth chamber 147, and enters a locking state at a position at which the pressure of the fourth chamber 147 supporting the hollow piston rod 120 from below and the weight of the hollow piston rod 120 itself are balanced, and does not descend more than this.

SUMMARY OF THE INVENTION

However, the pressure of the fourth chamber 147 is substantially atmospheric pressure when the hollow piston rod 120 descends initially. As a result, considerable volume compression is necessary to raise the pressure up to a high pressure supporting the weight of the hollow piston rod 120 itself, and thus the hollow piston rod 120 must descend considerably until this happens. Consequently, there is a considerable difference between the height of the hollow piston rod 120 in the state shown in FIG. 4 and the height of the hollow piston rod 120 in the state shown in FIG. 5, and this difference cannot be reduced.

Not only must the second communication path 134 communicating the first chamber 114 with the second chamber 126 be formed in the cover member 127 of the hollow piston rod 120, but also a first communication path 133 communicating the first chamber 114 with the second chamber 126 must be formed between the inner circumferential wall and the outer circumferential wall of the hollow piston rod 120. In order to form the first communication path 133 between the inner circumferential wall and the outer circumferential wall of the hollow piston rod 120, the wall thickness of the hollow piston rod 120 must be thickened, and a difficult machining process must be performed along the axial direction of the hollow piston rod 120.

The present invention was made taking the aforementioned problems into account, and has an object of providing a fluid cylinder mechanism that can maintain a locking state without substantially following the return movement of a piston, when the piston is drawn into the cylinder and enters the locking state.

In a fluid cylinder mechanism according to the present invention equipped with a cylinder having a base end and an open end, and a piston having a flange portion disposed inside of the cylinder and a rod portion that passes through the open end of the cylinder, a space inside the cylinder being partitioned by the flange portion of the piston into a first pressurized chamber on a side thereof at the base end and a second pressurized chamber on a side thereof at the open end, the mechanism includes: a first flow path that permits flow of a fluid from the first pressurized chamber to the second pressurized chamber; a second flow path that permits flow of a fluid from the second pressurized chamber to the first pressurized chamber; and an opening and closing means for opening and closing the second flow path.

According to the present invention, the flow of fluid from the second pressurized chamber to the first pressurized chamber is prevented by the blocking of the second flow path by the opening and closing means. As a result, when the pressure of the first pressurized chamber rises due to the piston receiving an external force and operating in a direction drawn into the cylinder, the pressure of the second pressurized chamber also rises due to the fluid in the first pressurized chamber flowing to the second pressurized chamber through the first flow path.

When the external force causing the piston to operate is released in the state in which the pressure of the second pressurized chamber has risen up to a predetermined level, return movement of the piston can be suppressed by the pressure of the second pressurized chamber, and the piston enters the locking state.

Consequently, in the locking state, it is possible to securely maintain the piston at a position not substantially changed from the position drawn into the cylinder.

In this case, it is preferable for the first flow path to be provided with a check valve that permits the flow of fluid from the first pressurized chamber to the second pressurized chamber, following compression of the fluid in the first pressured chamber due to the operation of the piston.

According to the present invention, when the pressure of the first pressurized chamber rises due to the piston operating in a direction drawn into the cylinder, the fluid in the first pressurized chamber has potential to flow to the second pressurized chamber through the first flow paths. At this time, the check valves permit flow of this fluid. As a result, when the pressure of the first pressurized chamber rises, the fluid inside the first pressurized chamber can automatically flow to the second pressurized chamber through the first flow path.

Consequently, the structure of the first flow path can be configured very simply.

In this case, it is preferable for the piston to have an internal space, the first flow path to be provided in the flange portion of the piston, and the second flow path to include a first communication path that passes through a side wall of the rod portion of the piston and communicates the second pressurized chamber with the internal space, and a second communication path that communicates the internal space of the piston with the first pressurized chamber.

According to the present invention, the first communication path is formed in the rod portion of the piston to pass through the side wall thereof.

According to this configuration, it is unnecessary to carry out a difficult machining process on the rod portion of the piston along the axial direction thereof, and as a result, to form the outside diameter of the rod portion to be larger so that the wall thickness of the rod portion of the piston is thicker, or to configure the outside diameter of the entire fluid cylinder mechanism to be larger, for example.

Therefore, it is possible to configure the outside diameter dimension of the fluid cylinder mechanism to be small.

In this case, it is preferable for the opening and closing means to include: a valve mechanism that opens and closes the second flow path in the internal space of the piston, and a switch member that is slidable along an axial direction of the rod portion in the internal space of the piston, and has a first end and a second end, the second end causing the valve mechanism to open and close in response to protrusion and retraction of the first end from an end of the rod portion.

According to the present invention, it is possible for the switch rod to make the second flow path open and close via the valve mechanism in response to the first end of the switch member projecting and retracting from the end of the rod portion of the piston. Specifically, when the first end of the switch member projects from the end of the rod portion, the valve mechanism opens the second communication path, and when the first end of the switch member immerses into the end of the rod portion, the valve mechanism blocks the second communication path.

Consequently, it is possible to configure an opening and closing structure of the second flow path very simply.

According to the present invention, when the pressure of the first pressurized chamber rises due to the piston receiving an external force and operating in a direction drawn into the cylinder, the pressure of the second pressurized chamber also rises. When the external force causing the piston to operate is released in the state in which the pressure of the second pressurized chamber has risen up to a predetermined level, return movement of the piston can be suppressed by the pressure of the second pressurized chamber, and the piston enters the locking state.

Consequently, in the locking state, it is possible to securely maintain the piston at a position not substantially changed from the position drawn into the cylinder.

DETAILED DESCRIPTION OF THE INVENTION

Figure 1:
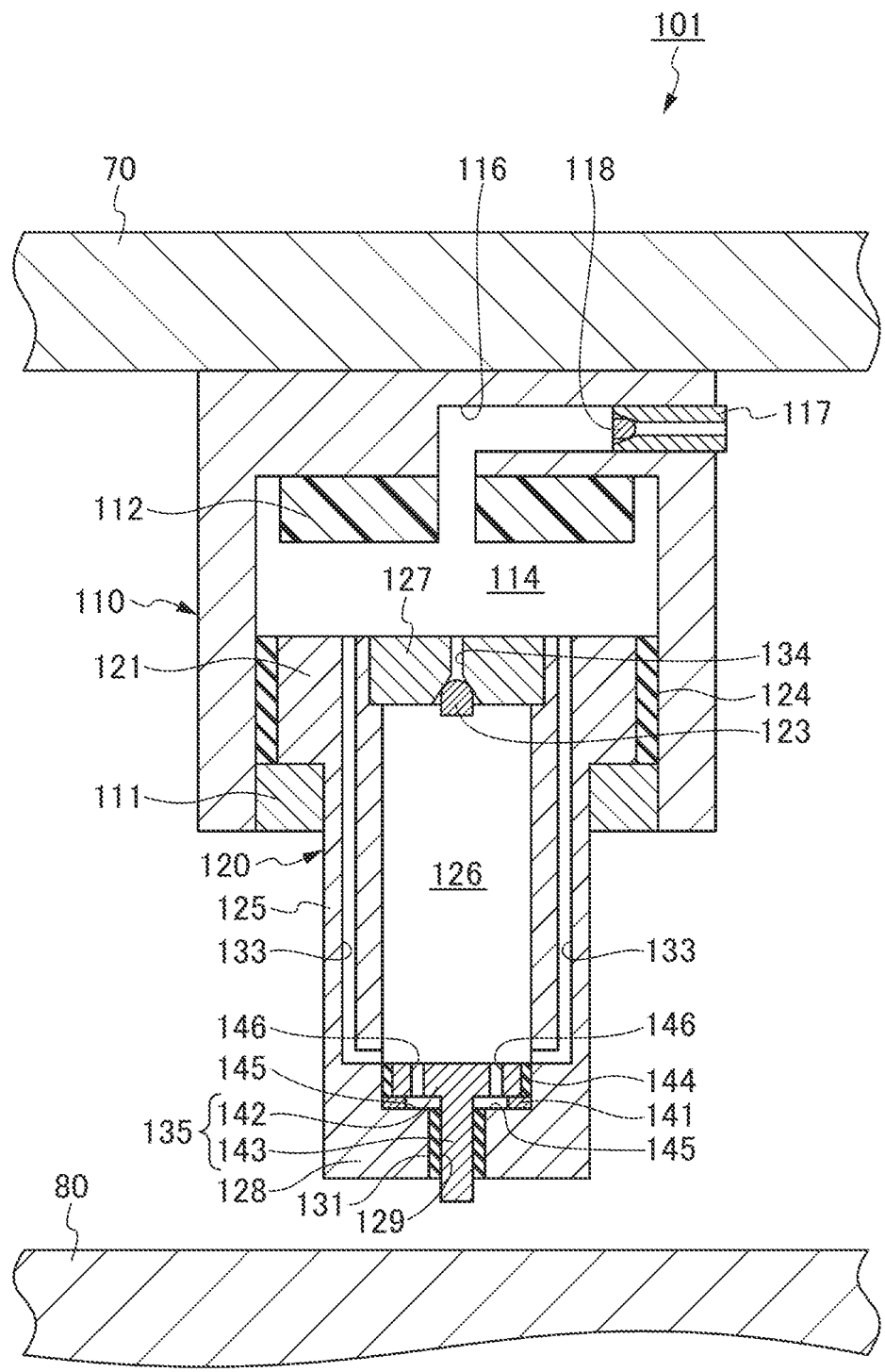
FIG. 1 is schematic longitudinal sectional view showing a state in which the displacement piston rod of the conventional fluid cylinder mechanism is at an OFF position.
Figure 2:
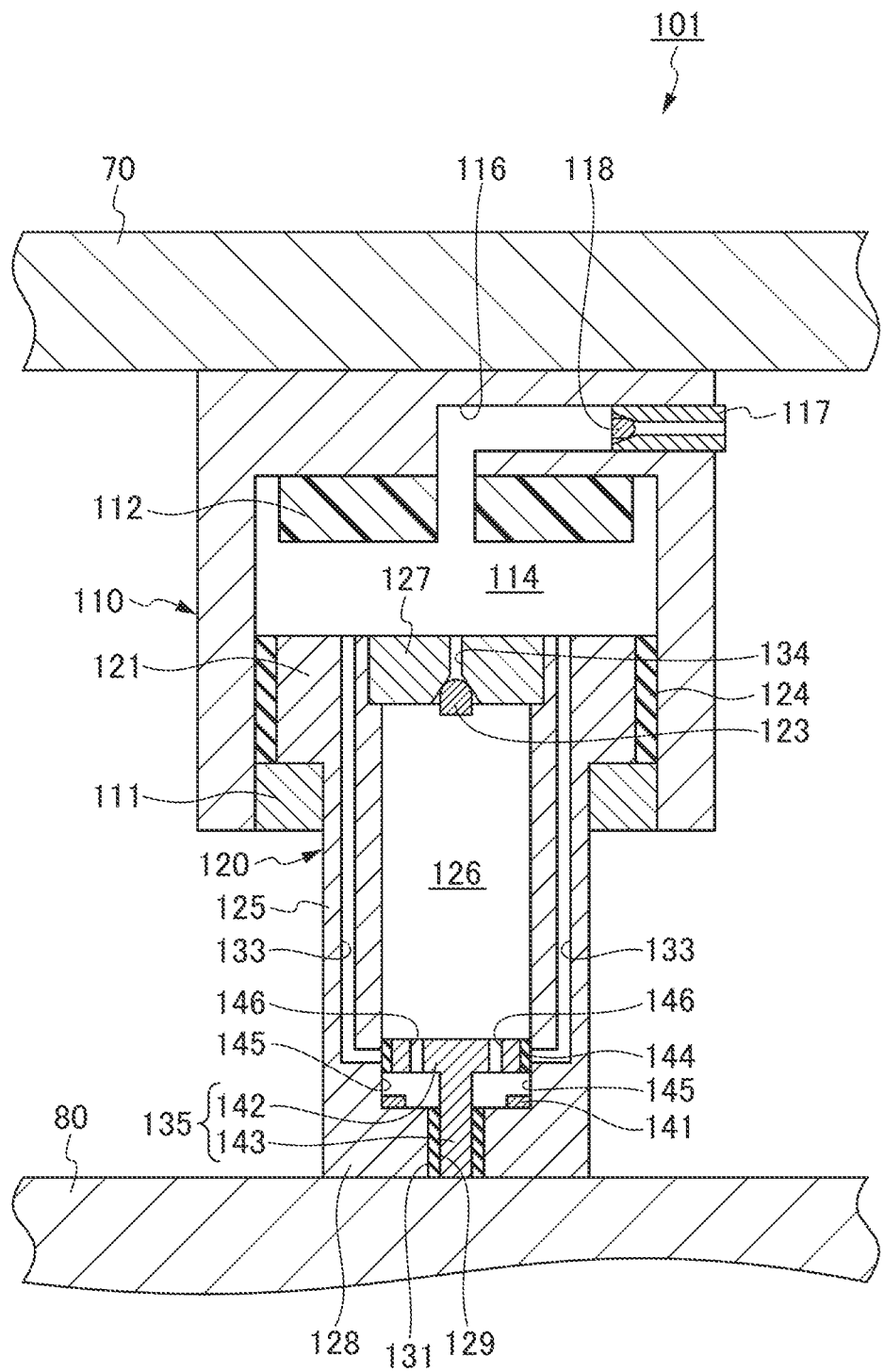
FIG. 2 is a schematic longitudinal sectional view showing a state in which the displacement piston rod of the conventional fluid cylinder mechanism has displaced to an ON position.
Figure 3:
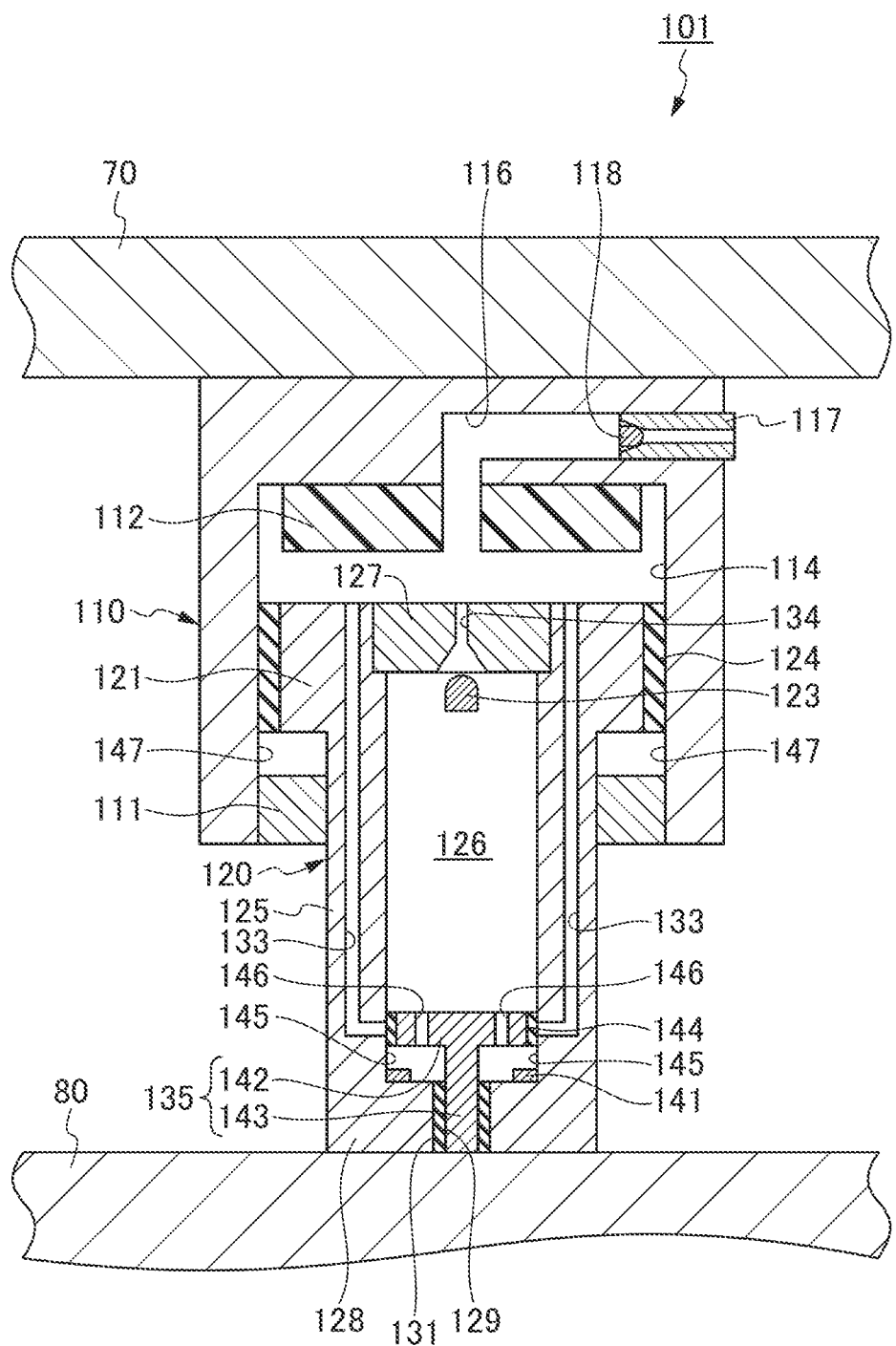
FIG. 3 is a schematic longitudinal sectional view showing a state in which the piston of the conventional fluid cylinder mechanism is in an intermediate position in the sleeve.
Figure 4:
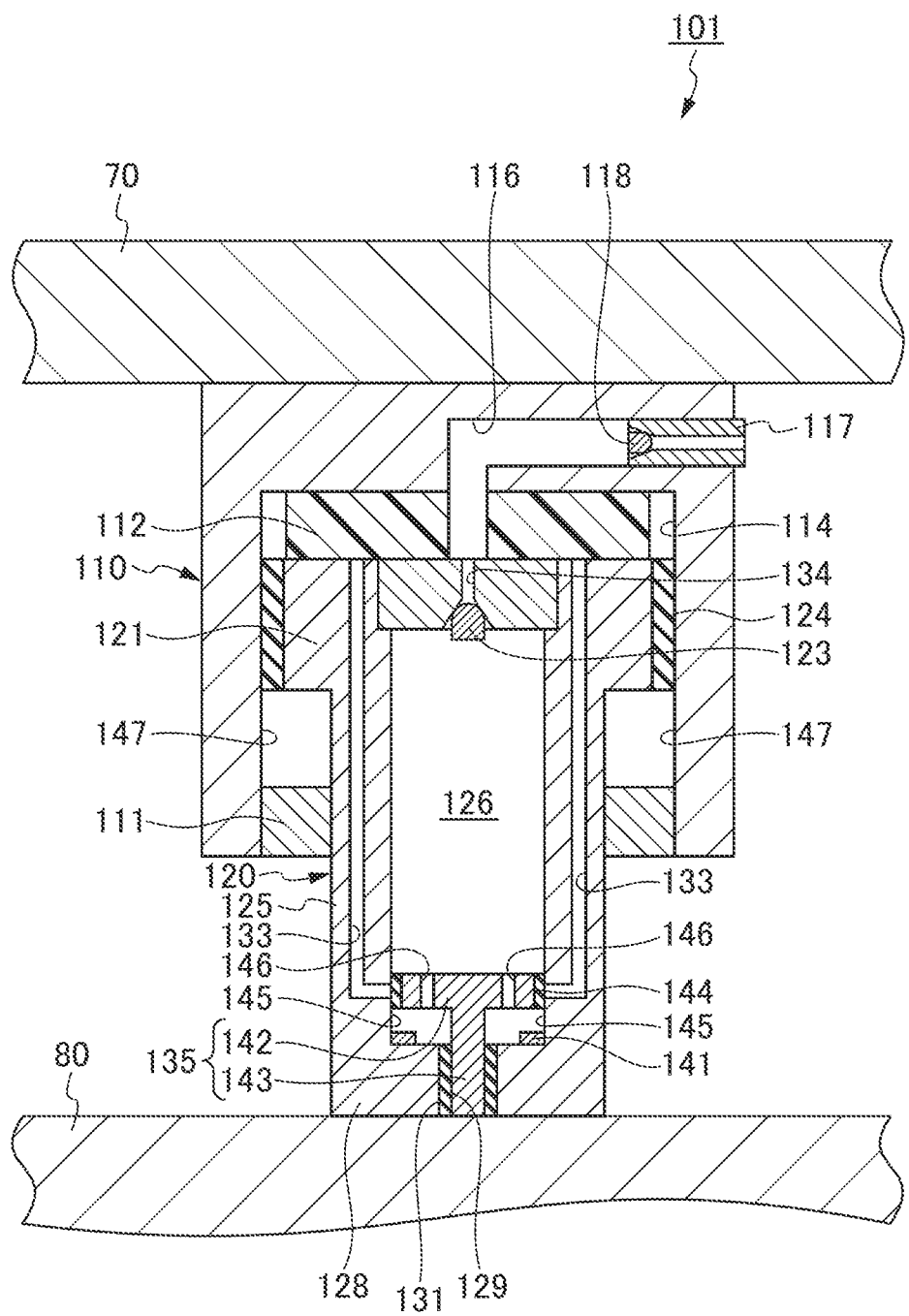
FIG. 4 is a schematic longitudinal sectional view showing a state in which the piston of the conventional fluid cylinder mechanism is at a base end side of the sleeve.
Figure 5:
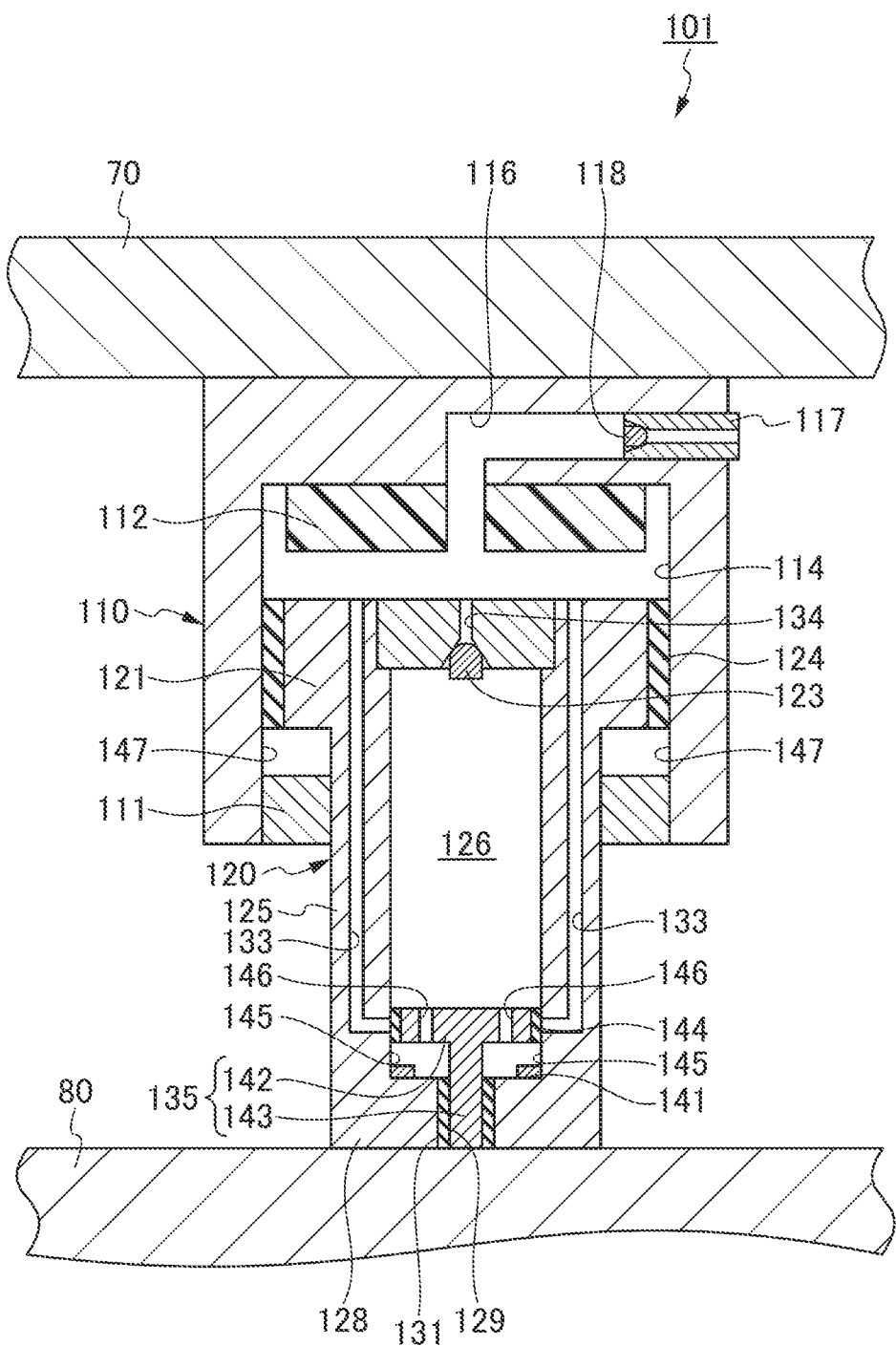
FIG. 5 is a schematic longitudinal sectional view showing a state in which the piston of the conventional fluid cylinder mechanism is in a locking state.

Hereinafter, embodiments of the present invention will be explained with reference to the drawings.

First Embodiment

FIGS. 6 to 10 are schematic longitudinal section views of a fluid cylinder mechanism 1 according to a first embodiment of the present invention, respectively showing a state in which a switch rod 37 thereof is in an OFF position, a state in which the switch rod 37 has displaced to an OFF position, a state in which a piston 20 is at an intermediate position in a cylinder chamber 13, a state in which the piston 20 is at a base end side of the cylinder chamber 13, and a state in which the piston 20 is in a locking state.

The fluid cylinder mechanism 1 includes a cylinder 10 and the piston 20.

The cylinder 10 is a cylindrical shape with one end open, and a ring member 11 is fit in the opening. The cylinder chamber 13, which extends from a side thereof at the base end 12 to the ring member 11 serving as an opening end, is formed in the cylinder 10. The inside diameter of the ring member 11 is formed to be smaller than the inside diameter of the cylinder chamber 13.

The cylinder chamber 13 is partitioned into a first pressurized chamber 14 on a side thereof at the base end 12, and a second pressurized chamber 15 on a side thereof at the opening end 11, by a flange portion 21 of the piston 20, as described later.

A feed path 16 is formed in the cylinder 10 on a side thereof at the base end 12. Operating air is fed to the first pressurized chamber 14 via the feed path 16. A supply pipe 17 is inserted into the feed path 16 of the cylinder 10, and a check value 18 is provided to the leading end of the supply pipe 17. Operating air in the first pressurized chamber 14 is prevented from escaping to outside of the fluid cylinder mechanism 1 by the check valve 18.

The piston 20 includes the flange portion 21 and a rod portion 25.

The flange portion 21 has an outside diameter corresponding to the inside diameter of the cylinder chamber 13.

The rod portion 25 has an outside diameter corresponding to the inside diameter of the ring member 11, and passes through the ring member 11 from the end of the flange portion 21 to be exposed outside of the cylinder 10.

The piston 20 has an internal space 26 that is open on a side thereof at the flange portion 21. The internal space 26 is partitioned by fitting a cover member 27 into this opening.

First flow paths 22, which permit the flow of fluid from the first pressurized chamber 14 to the second pressurized chamber 15, are provided in the flange portion 21 of the piston 20.

The first flow paths 22 include check valves 23 that permit the flow of fluid from the first pressurized chamber 14 to the second pressurized chamber 15, following compression of the fluid in the first pressurized chamber 14 by way of operating in the direction in which the piston 20 is drawn inside the cylinder 10.

A seal member 24 that seals between the inner circumferential wall of the cylinder chamber 13 is installed at the circumferential wall of the flange portion 21.

Second flow paths 23, which permit the flow of fluid from the second pressurized chamber 15 to the first pressurized chamber 14, are provided in the rod portion 25 of the piston 20 and the cover member 27.

The second flow paths 32 include first communication paths 33 and a second communication path 34.

The first communication paths 33 pass through the side wall of the rod portion 25, and communicate the second pressurized chamber 15 with the internal space 26 of the piston 20.

The second communication path 34 passes through the cover member 27, and communicates the internal space 26 of the piston 20 with the first pressurization chamber 14.

The first communications paths 33 and the second communication path 34 connect together via the internal space 26 of the piston 20.

An opening and closing means 35 for opening and closing the second flow path 32 is provided in the piston 20.

The opening and closing means 35 includes a valve mechanism 36 and a switch rod 37 serving as a switch member.

The valve mechanism 36 opens and closes the second flow path 32 in the internal space 26 of the piston 20.

The switch rod 37 is slidable along an axial direction of the rod portion 25 in the internal space 26 of the piston 20. A switch end 38 serving as a first end of the switch rod 37 freely projects and retracts through a penetrating hole 29 formed in an exposed end 28 serving as an end of the rod portion 25. The valve mechanism 36 is attached to the second end of the switch rod 37.

When the switch end 38 of the switch rod 37 projects downward from the exposed end 28, the valve mechanism 36 separates from the second communication path 34 to open the second communication path 34.

When the switch end 38 of the switch rod 37 immerses inward into the exposed end 28, the valve mechanism 36 abuts the second communication path 34 to block the second communication path 34.

A seal member 31 that seals between the switch rod 37 is installed at the inner circumferential wall of the penetrating hole 29.

In the fluid cylinder mechanism 1 configured as described above, a side of the cylinder 10 at a base end 12 is fixed to a bottom surface of an upper mold 70 of a molding apparatus 50, for example. On the other hand, the exposed end 28 of the piston 20 is positioned slightly above a top surface of a moveable mold 80 that moves vertically relative to the upper mold 70.

Figure 6:
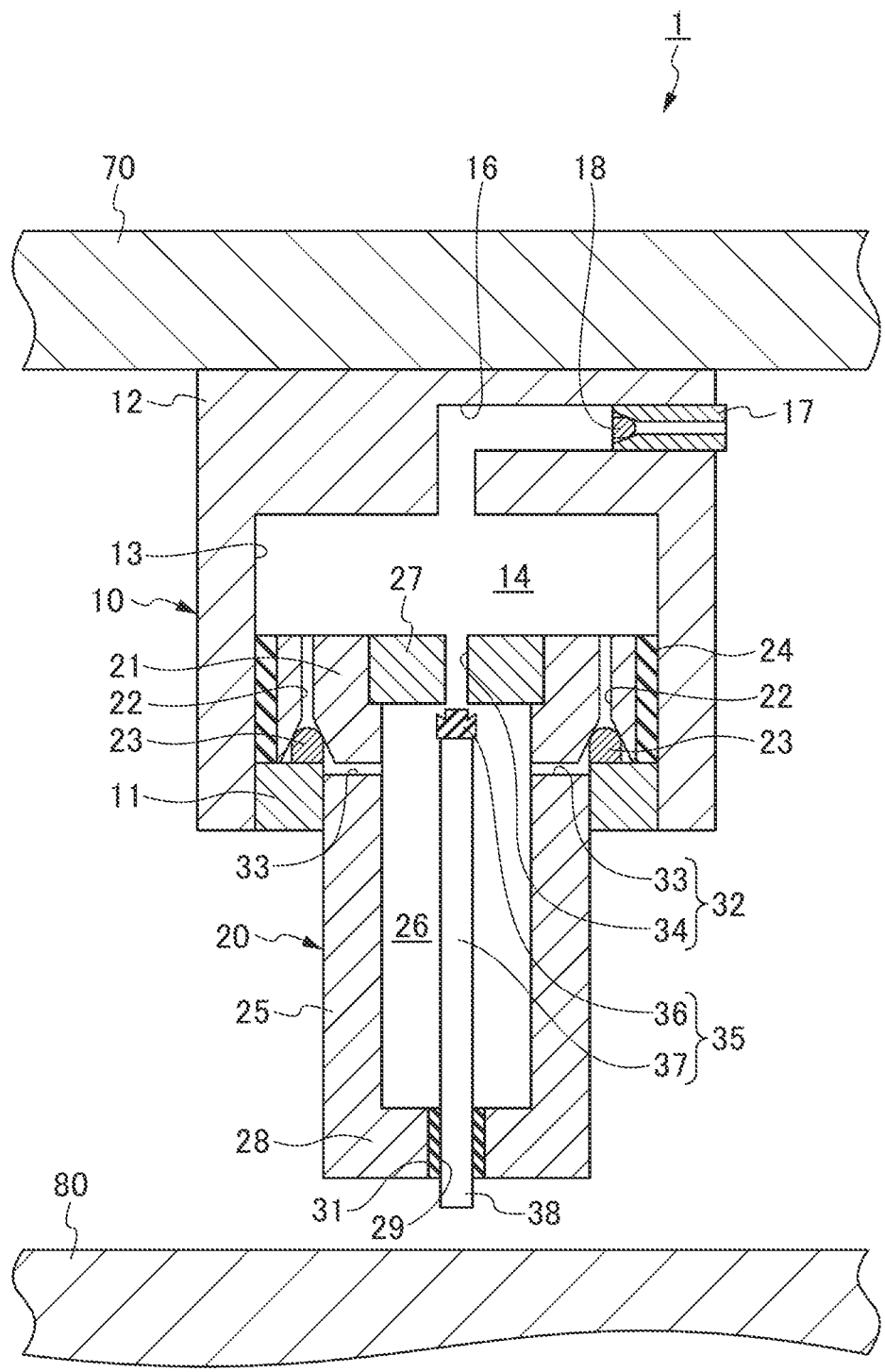
FIG. 6 is a schematic longitudinal sectional view showing a state in which a switch rod of a fluid cylinder mechanism according to a first embodiment of the present invention is in an OFF position.

As shown in FIG. 6, in the initial state, the top surface of the moveable mold 80 is separated from the exposed end 28 of the piston 20 and the switch end 38 of the switch rod 37, which is at a predetermined protruding position.

At this time, a lower end surface of the flange 21 of the piston 20 is at a position contacting an upper end surface of the ring member 11, a result of which the second pressurized chamber 15 is in a state not having any substantial space. Since the switch end 38 of the switch rod 37 is at a predetermined protruding position, the valve mechanism 36 is in a state opening the second communication path 34.

In this state, the first pressurized chamber 14 and the internal space 26 of the piston 20 are filled with operating air of a predetermined pressure.

Figure 7:
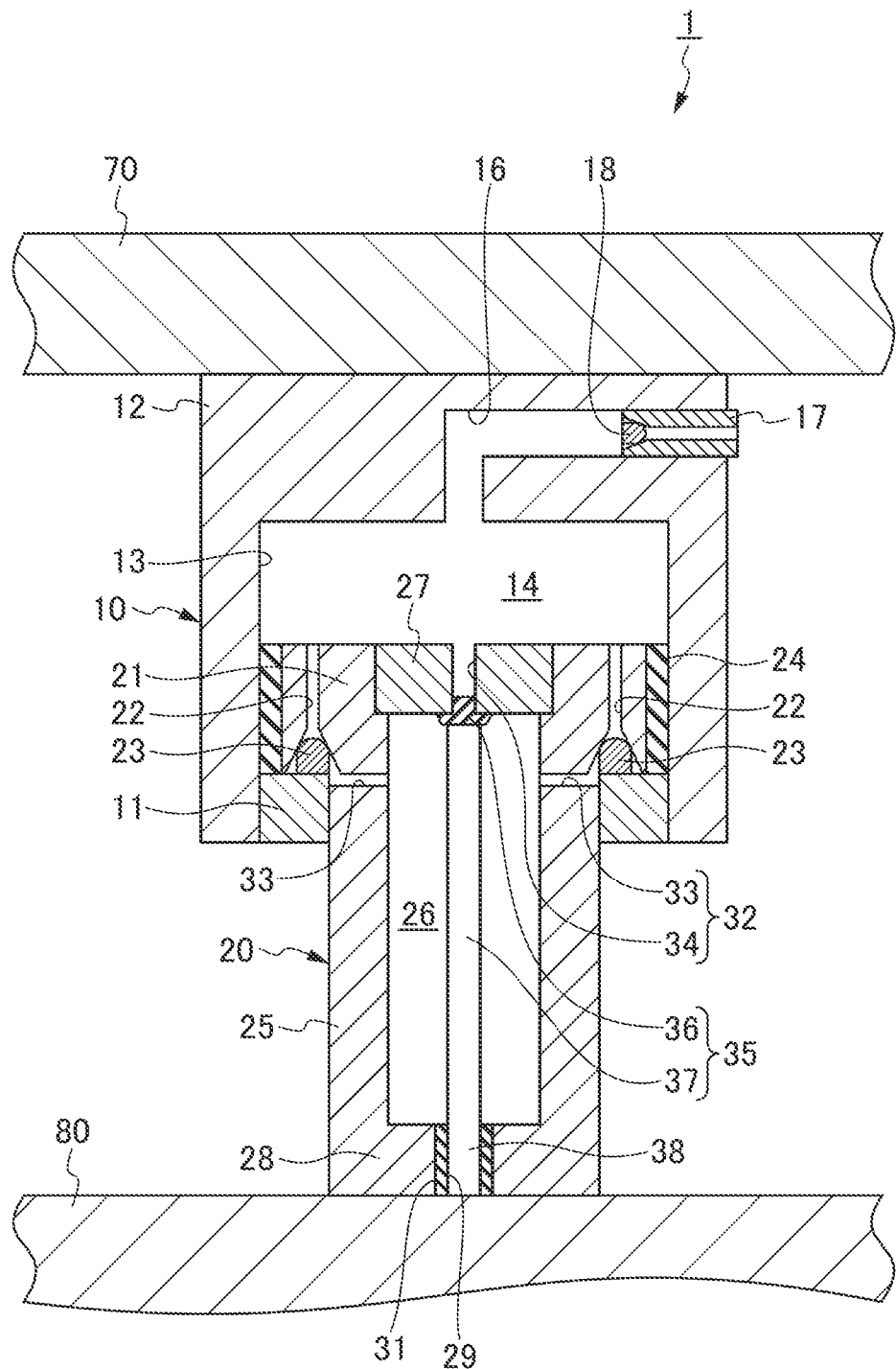
FIG. 7 is a schematic longitudinal sectional view showing a state in which the switch rod of the fluid cylinder mechanism according to the first embodiment of the present invention is displaced to an ON position.

As shown in FIG. 7, when the upper mold 70 and the moveable mold 80 operate in directions relatively approaching each other, and the switch end 38 of the switch rod 37 immerses inward in the rod portion 25 by way of the moveable mold 80, the valve mechanism 36 blocks the second communication path 34.

At this time, the pressure of the operating air does not change, since there is no substantial change in the volume of the first pressurized chamber 14 and the internal space 26 of the piston 20.

Figure 8:
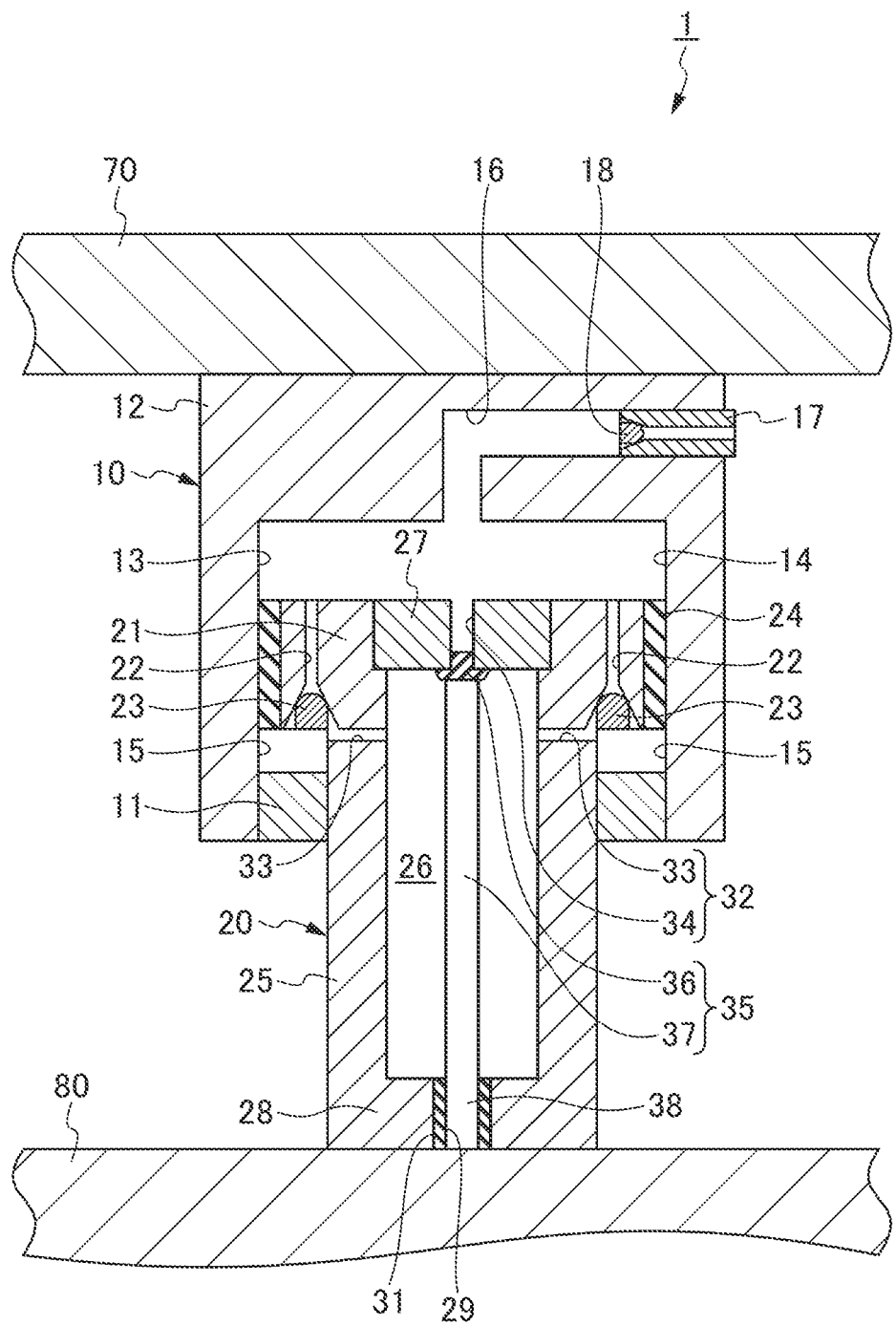
FIG. 8 is a schematic longitudinal sectional view showing a state in which a piston of the fluid cylinder mechanism according to the first embodiment of the present invention is at an intermediate position in a cylinder chamber.

As shown in FIG. 8, when the upper mold 70 and the moveable mold 80 further operate in directions relatively approaching each other, the piston 20 rises relative to the cylinder 10, and the flange portion 21 relatively rises inside the cylinder chamber 13. As a result, the height of the first pressurized chamber 14 contracts, while the height of the second pressurized chamber 15 extends.

Since the second pressurized chamber 15 is in communication with the internal space 26 of the piston 20 via the first communication paths 33, the pressure of the second pressurized chamber 15 is equal to the pressure of the internal space 26 of the piston 20.

When the height of the first pressurized chamber 14 contracts, the pressure of the first pressurized chamber 14 becomes higher than the pressures of the second pressurized chamber 15 and the internal space 26 of the piston 20. If the pressure differential therebetween exceeds a predetermined value, the check valve 23 will open, and the pressure of the first pressurized chamber 14 will be bled off to the second pressurized chamber 15 and the internal space 26 of the piston 20, thereby eliminating the pressure differential therebetween. When the pressure differential has been eliminated, the check valve 23 closes.

The pressure of the first pressurized chamber 14 and the pressures of the second pressurized chamber 15 and the internal space 26 of the piston 20 gradually rise while assuming a substantially equal state, by repeating this operation.

Figure 9:
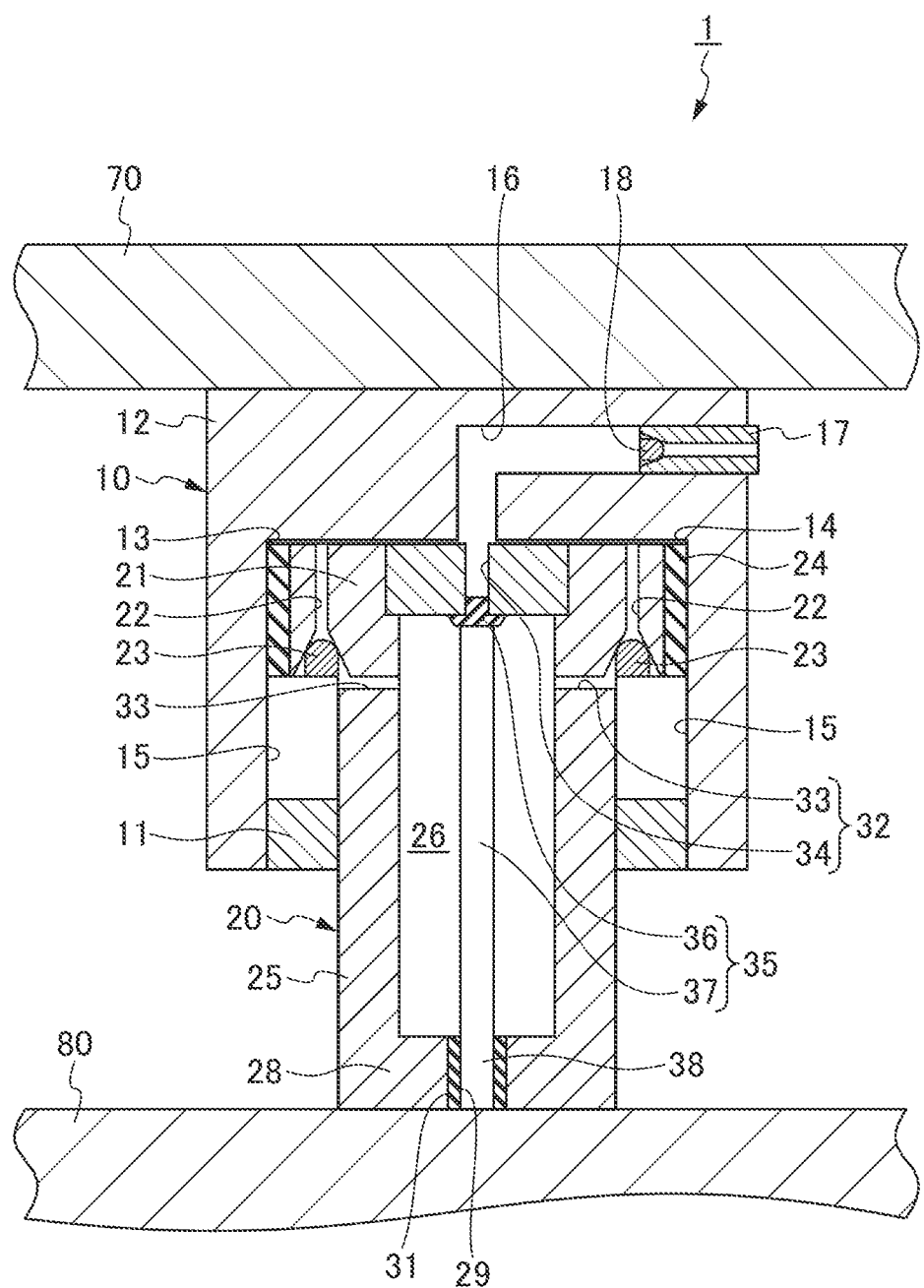
FIG. 9 is a schematic longitudinal sectional view showing a state in which the piston of the fluid cylinder mechanism according to the first embodiment of the present invention is at a base end side of the cylinder chamber.

As shown in FIG. 9, the upper mold 70 and the moveable mold 80 further operate in directions relatively approaching each other until the top surface of the flange portion 21 of the piston 20 rises to a position (ascent limit position) nearly contacting a ceiling surface of the cylinder chamber 13 of the cylinder 10.

At this time, the first pressurized chamber 14 has substantially no space, and the pressure of the feed path 16 and the pressures of the second pressurized chamber 15 and the internal space 26 of the piston 20 are substantially equal, and in an extraordinarily high pressure state.

Figure 10:
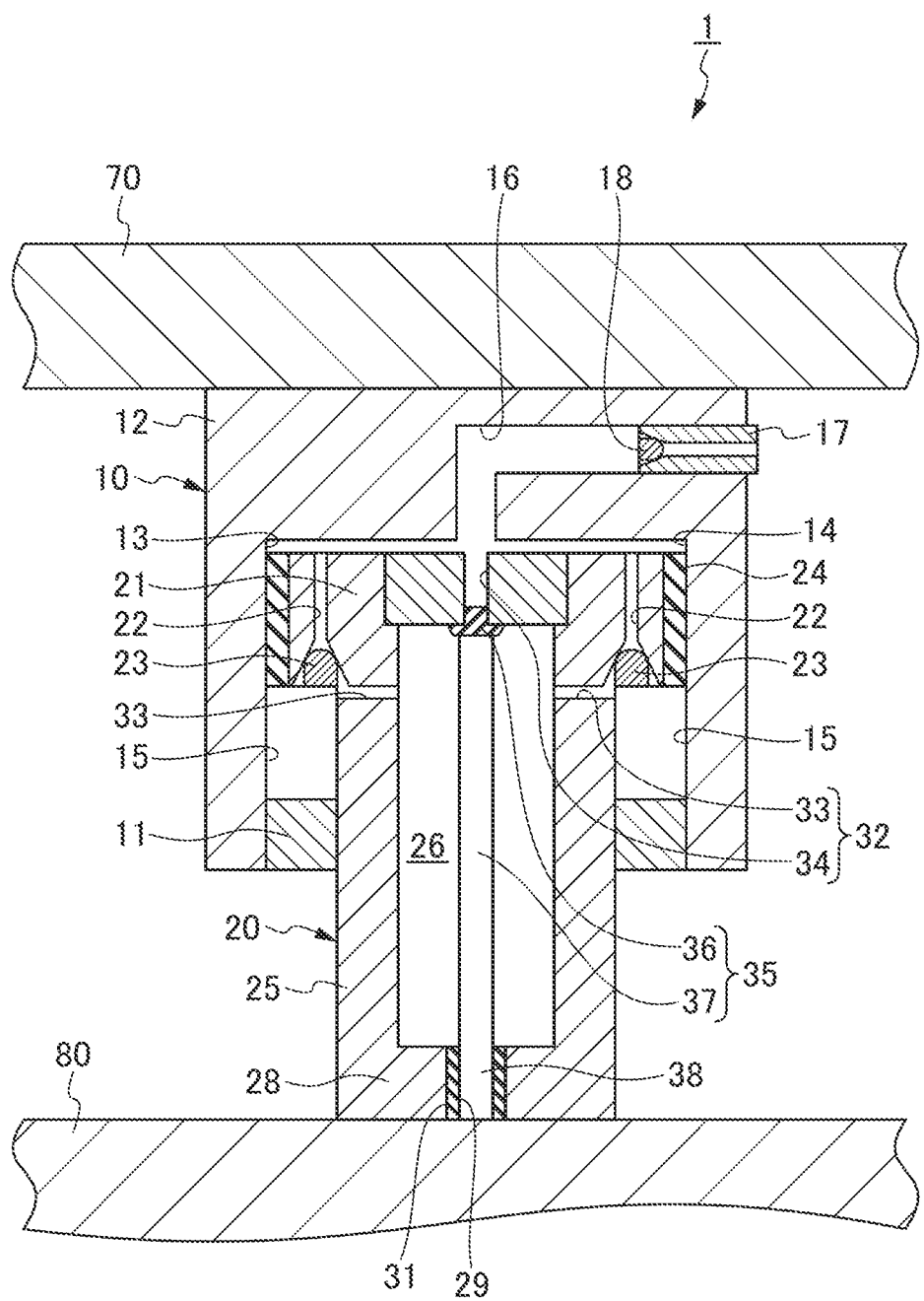
FIG. 10 is a schematic longitudinal sectional view showing a state in which the piston of the fluid cylinder mechanism according to the first embodiment of the present invention is in a locking state.

As shown in FIG. 10, when the upper mold 70 and the moveable mold 80 operate in directions relatively separating from the state shown in FIG. 9, the force supporting the rod portion 25 of the piston 20 from below is lost. Under ordinary circumstances, the piston 20 would descend relative to the cylinder 10 as a result. However, the fluid cylinder mechanism 1 operates as follows.

In this situation, the pressures of the second pressurized chamber 15 and the internal space 26 of the piston 20 are in an extraordinarily high pressure state.

As a result, the extraordinarily high pressure of the second pressurized chamber 15 supports the flange portion 21 of the piston 20 from below. In other words, the piston 20 is supported by the pressure of the second pressurized chamber 15 at a position at which the pressure of the second pressurized cylinder 15 and the weight of the piston 20 itself are balanced, and does not descend more than this.

Since the pressure of the second pressurized chamber 15 has attained an extraordinarily high pressure in the state shown in FIG. 9, even if the force supporting the rod portion 25 from below by the moveable mold 80 were lost, the pressure of the first pressurized chamber 14 would decline suddenly due to the volume increase of the first pressurized chamber 14, and the piston 20 would come to be balanced with the internal pressure of the second pressurized chamber 15, without descending substantially shown in FIG. 10.

Therefore, the height of the piston 20 in the state shown in FIG. 9 and the height of the piston 20 in the state shown in FIG. 10 are not substantially changed, and the piston only descends slightly. The amount of this descent is to an extent that can almost be ignored.

More specifically, due to the extraordinarily high pressure of the second pressurized chamber 15, the piston 20 is restrained from any return movement and enters a locking state.

Consequently, in the locking state, the piston 20 is securely maintained at a position not substantially changed from the position drawn into cylinder 10.

The molding apparatus 50 includes a lower mold 60, the upper mold 70, and the moveable mold 80, as shown in FIGS. 12 to 20.

The lower mold 60 has a molding portion 62 projecting from the center of a base portion 61, which extends in a horizontal direction. The molding portion 62 curves in an upward convex shape, for example, and a longitudinal cross section thereof curves in a semielliptical shape, for example.

A work supporting member 63 is disposed on both left and right sides of the base portion 61. The work supporting members 63 each support an end of a work (for example, a side panel of an automobile) W placed thereon. The work supporting members 63 are supported by strut members 64. The strut members 64 are supported by a suitable damper mechanism (not illustrated), and when receiving a depressing force exceeding a predetermined level, they descend in response to this depressing force.

Figure 12:
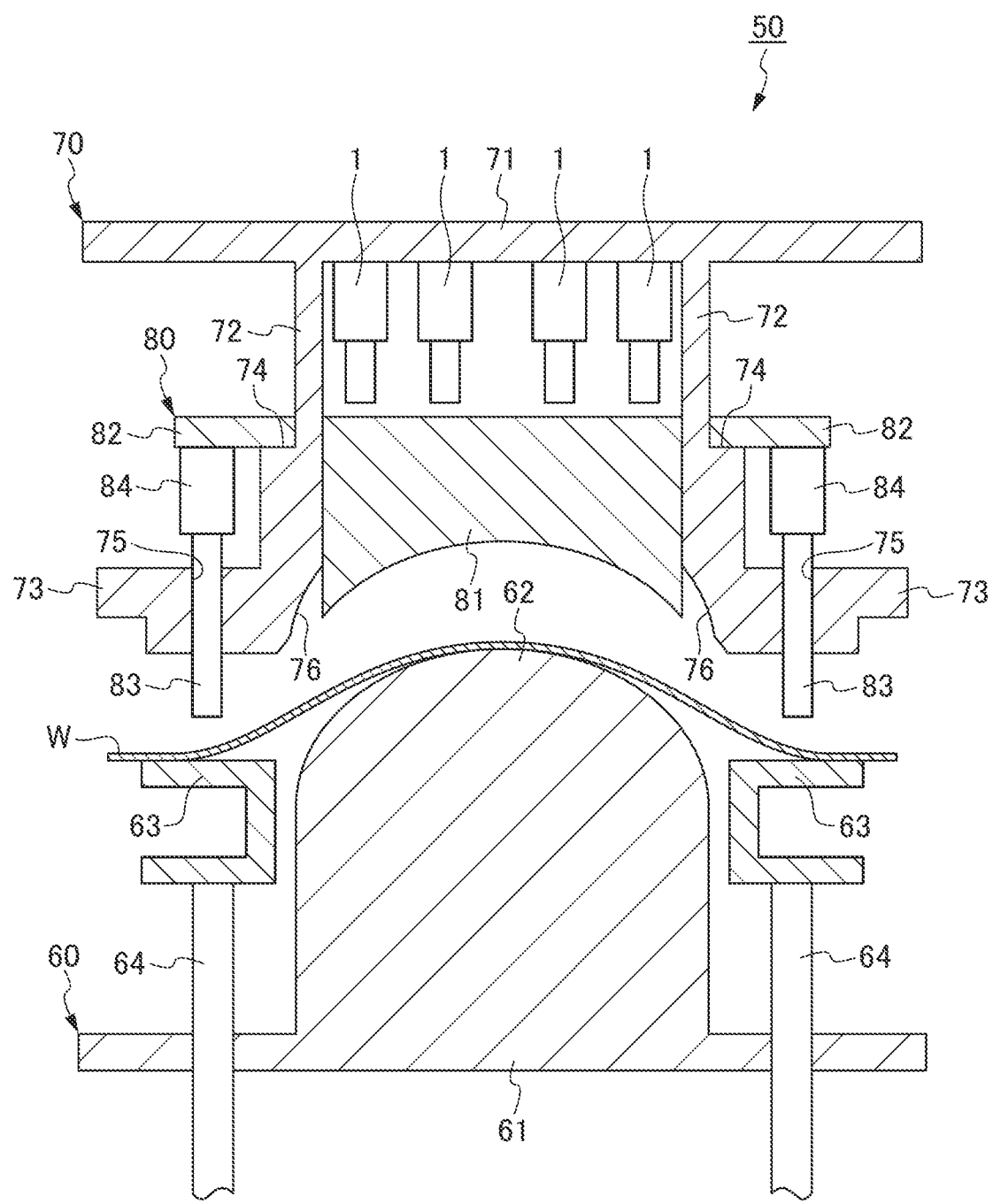
FIG. 12 is a longitudinal sectional view of main parts showing a state in which the molds are opened of a molding apparatus according to the embodiment that is equipped with the fluid cylinder mechanism of the present invention shown in FIG. 6.

The upper mold 70 is supported on a bolster (not illustrated) that is displaceable along the vertical direction in FIG. 12 according to the operation of a drive mechanism that is not illustrated. As a result, the upper mold 70 approaches or separates relative to the lower mold 60 following the displacement of the bolster.

The upper mold 70 has hanging portions 72 that hang from both left and right sides of a base portion 71, which extends in a horizontal direction, and horizontal portions 73 that extend horizontally from a lower end of the hanging portions 72 in directions away from each other. Support portions 74 are respectively formed in the middle of the hanging portions 72.

The moveable mold 80, which is described later, is disposed between the left and right hanging portions 72 of the upper mold 70. As a result, penetrating holes (not illustrated) through which horizontal portions 82 (described later) of the moveable mold 80 pass are respectively formed in an elongated hole shape along the vertical direction above the support portions 74.

Insertion holes 75 in which the displacement rods 83 (described later) of the moveable mold 80 are respectively inserted to be displaceable along the vertical direction are respectively formed in left and right horizontal portions 73 of the upper mold 70.

Molding portions 76 are provided in a shape cut out so as to curve from an edge surface of the horizontal portion 73 on a side facing the lower mold 60 until reaching an edge surface of the hanging portions 72 on a side facing the moveable mold 80. The molding portions 76 respectively oppose each end on the left and right sides of the molding portion 62 of the lower mold 60.

In the upper mold 70, four of the fluid cylinder mechanisms 1 are fixed to the base portion 71 between the right and left hanging portions 72, with the axial directions thereof all oriented in the vertical direction.

The moveable mold 80 has a molding portion 81 disposed between the left and right hanging portions 72 of the upper mold 70, and horizontal portions 82 that extend to the left and right from the molding portion 81. A concave portion curved so as to correspond to the curve of the molding portion 62 of the lower mold 60 is formed in the molding portion 81.

The horizontal portions 82 pass through the above-mentioned penetrating holes (not illustrated) formed in the hanging portions 72 of the upper mold 70 to protrude to the left and right. The moveable mold 80 relatively displaces in the vertical direction relative to the upper mold 70, since the horizontal portions 82 displace in the vertical direction along the above-mentioned penetrating holes formed in an elongated hole shape.

Cylinders 84 for moveable mold displacement, which cause displacement rods 83 of the moveable mold 80 to displace in the vertical direction, are fixed to the protruding ends of the horizontal portions 82. When the cylinders 84 for moveable mold displacement receive a depressing force exceeding a predetermined level, they descend in response to this depressing force.

As shown in FIG. 12, when the molding apparatus 50 is in an open mold state, the moveable mold 80 rests and is supported on the support portions 74 of the upper mold 70. At this time, the top surface of the moveable mold 80 is at a position separated from the lower ends of the pistons 20 of the fluid cylinder mechanisms 1. The displacement rods 83 are in an extended state of a predetermined length, and the lower ends of the displacement rods 83 are at positions separated from the top surface of the work W placed on the work supporting members 63. The work supporting members 63 are positioned at a predetermined height from the base portion 61 of the lower mold 60.

Figure 13:
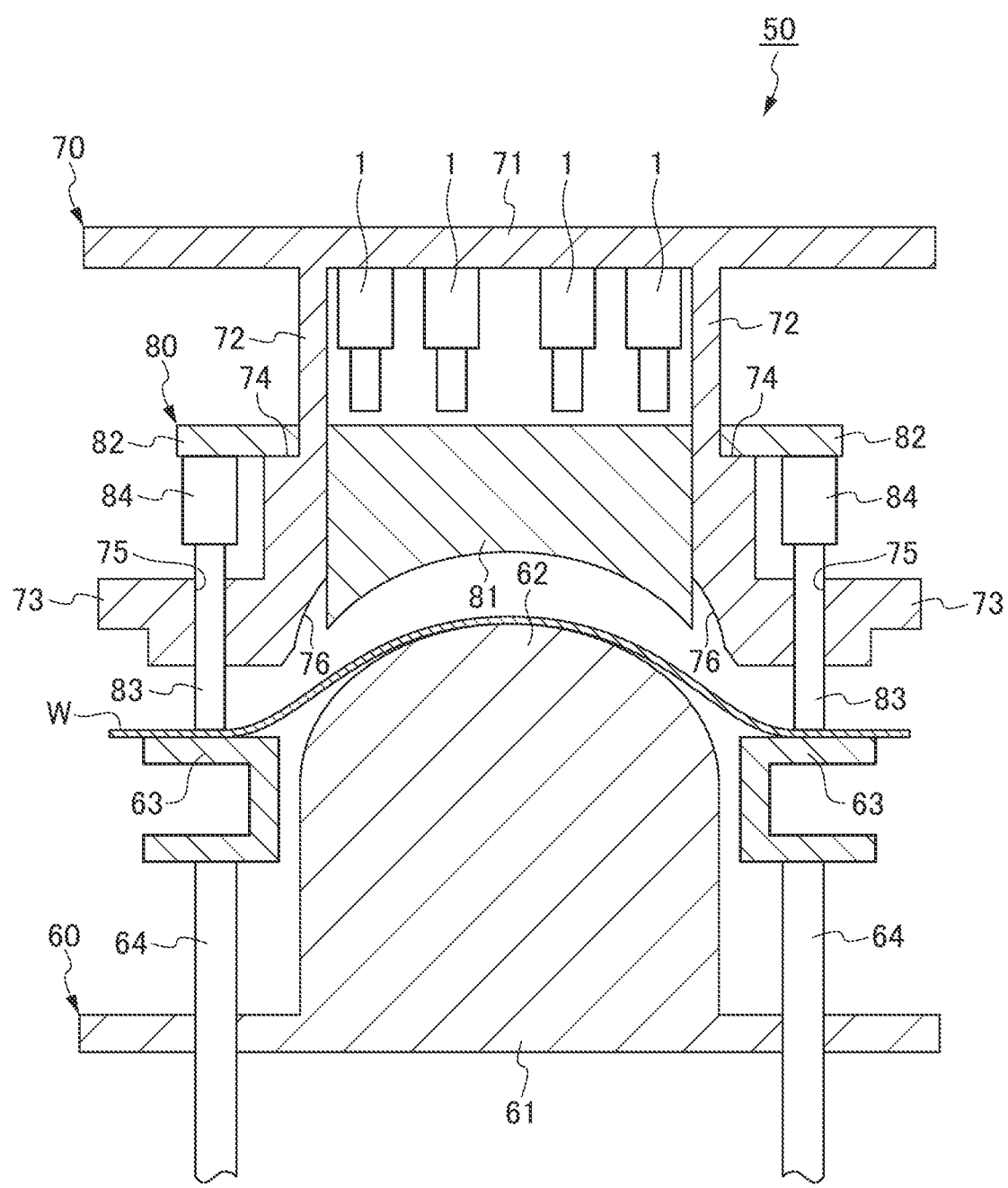
FIG. 13 is a longitudinal sectional view of main parts showing a state in which the upper mold of the molding apparatus has descended, and the molding apparatus sandwiches both end portions of a work.

As shown in FIG. 13, when the upper mold 70 of the molding apparatus 50 is descending, the lower end of the displacement rods 83 first clamp the work W by contacting the top surface of the work W placed on the work supporting members 63. At this time, the cylinders 84 for the moveable mold displacement do not operate; therefore, the displacement rods 83 are in an extended state of a predetermined length. There is no change in the relative positional relationship between the upper mold 70 and the moveable mold 80, and thus the top surface of the moveable mold 80 is at a position separated from the lower ends of the pistons 20 of the fluid cylinder mechanisms 1. Since the damper mechanisms of the strut members 64 do not operate, the work supporting members 63 are positioned at a predetermined height from the base portion 61 of the lower mold 60.

Figure 14:
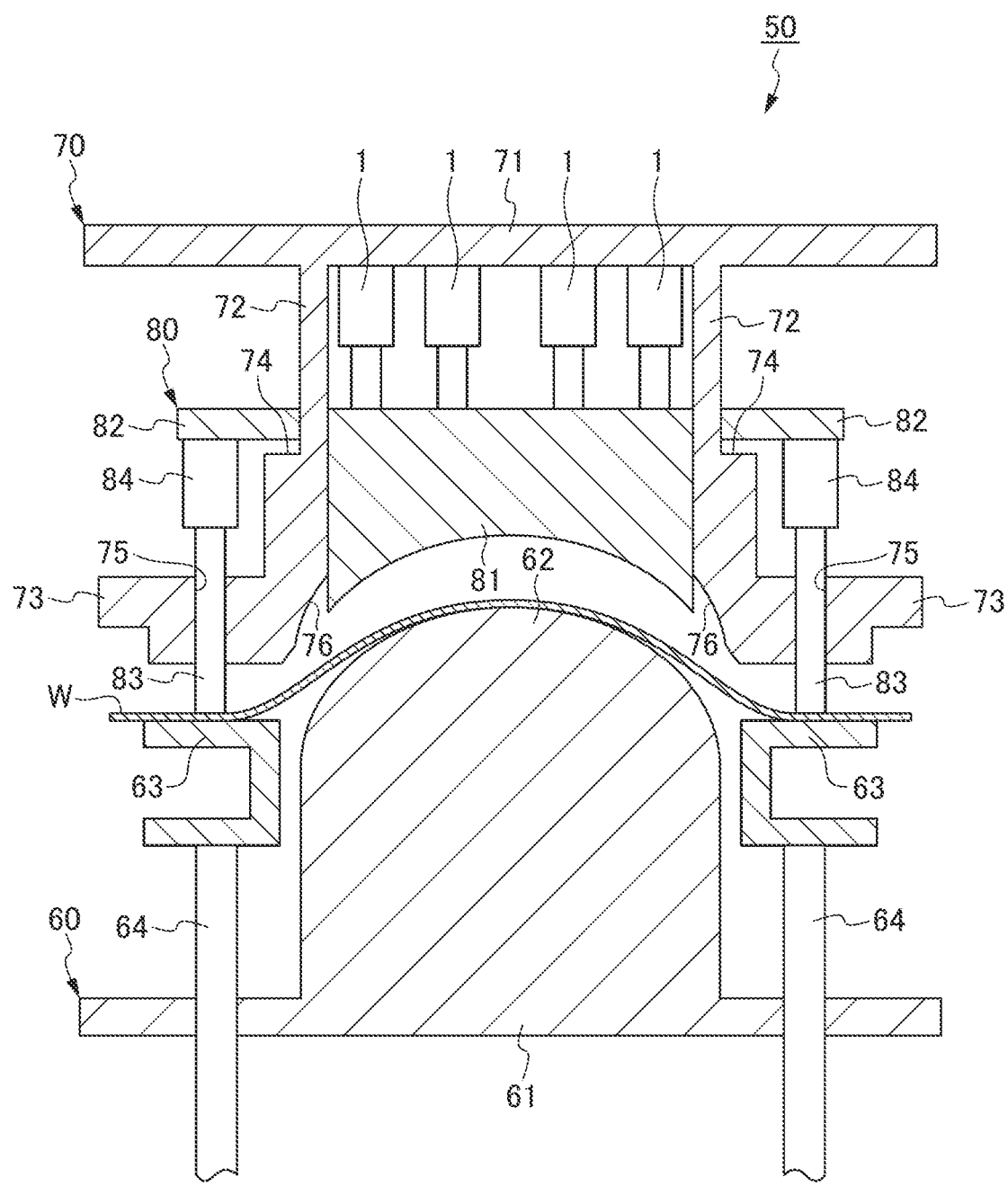
FIG. 14 is a longitudinal sectional view of main parts showing a state in which the upper mold of the molding apparatus has descended further, and the switch rod of the fluid cylinder mechanism has displaced to an ON position.

As shown in FIG. 14, when the upper mold 70 of the molding apparatus 50 descend further, the displacement rods 83 are maintained in the extended state of a predetermined length since the cylinders 84 for moveable mold displacement do not operate. As a result, the moveable mold 80 is retained at the same position as in FIG. 13. The lower ends of the pistons 20 of the fluid cylinder mechanisms 1 thereby contact the top surface of the moveable mold 80. In addition, the moveable mold 80 separates upwards from the support portions 74 of the upper mold 70. At this time, the work supporting members 63 are positioned at a predetermined height from the base portion 61 of the lower mold 60, since the damper mechanism of the strut members 64 do not operate.

Figure 15:
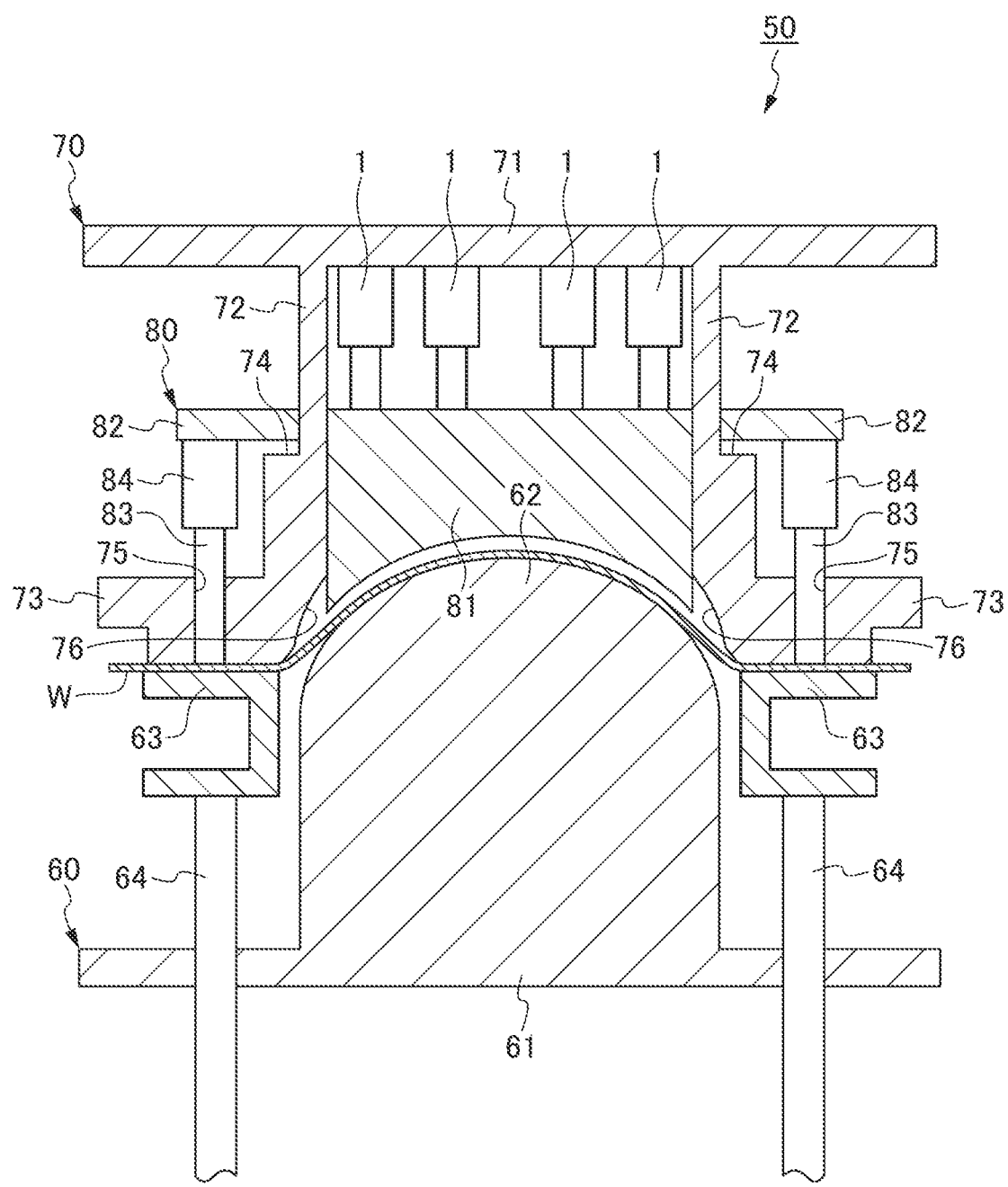
FIG. 15 is a longitudinal sectional view of main parts showing a state in which the upper mold of the molding apparatus has descended further, and the displacement rod of the moveable mold has shortened to a predetermined length.

As shown in FIG. 15, when the upper mold 70 of the molding apparatus 50 descends further, the lower ends of the pistons 20 of the fluid cylinder mechanisms 1 press the top surface of the moveable mold 80. The cylinders 84 for moveable mold displacement thereby operate, and the displacement rods 83 shorten to a predetermined minimum length. At this time, there is no substantial change in the relative positional relationship between the upper mold 70 and the moveable mold 80. The damper mechanisms of the strut members 64 do not operate; therefore, the work supporting members 63 are positioned at a predetermined height from the base portion 61 of the lower mold 60.

Figure 16:
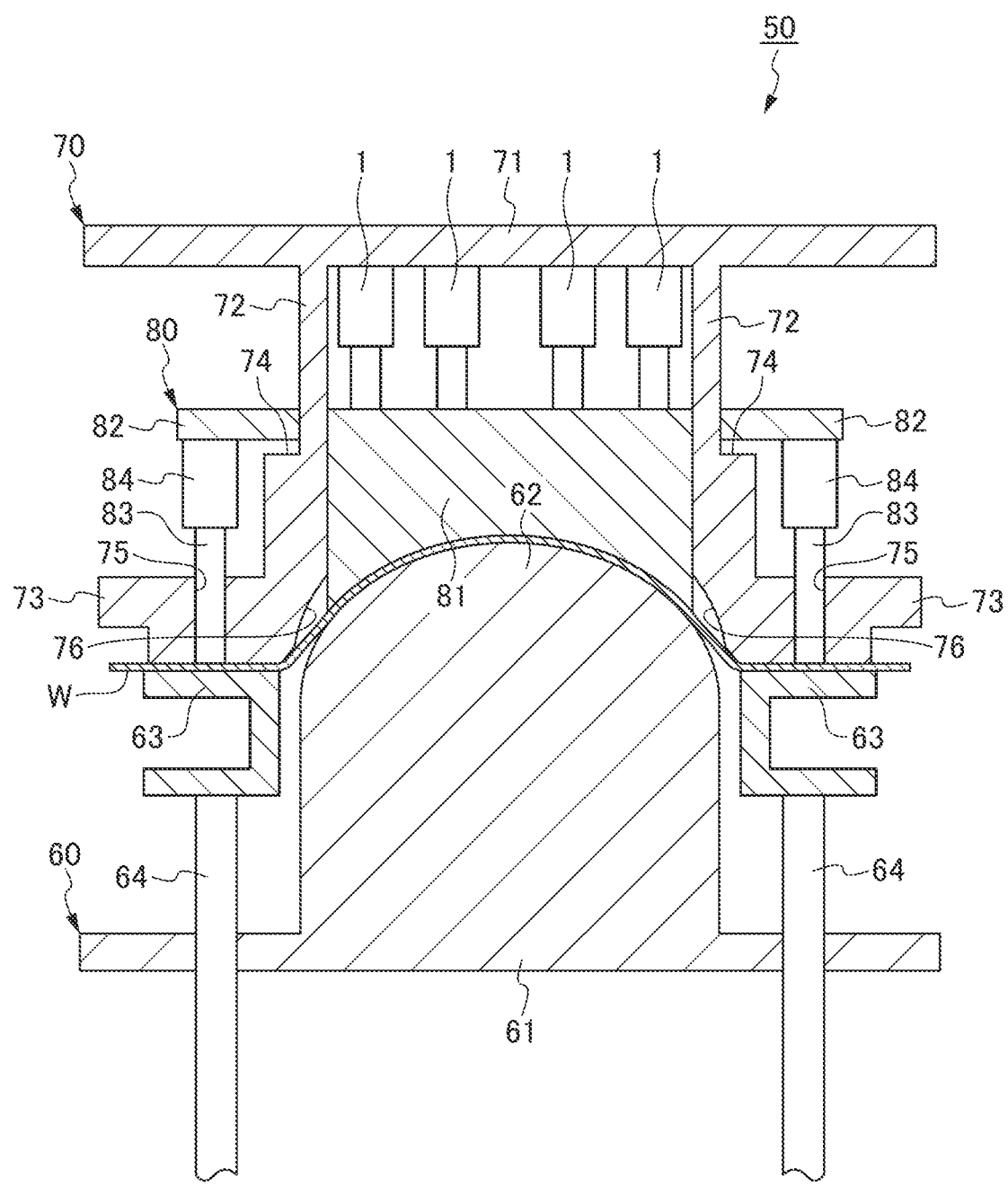
FIG. 16 is a longitudinal sectional view of main parts showing a state in which the upper mold of the molding apparatus has descended further, and the moveable mold has reached a bottom dead point while the work supporting members descend.

As shown in FIG. 16, the displacement rods 83 cannot shorten more than this if the upper mold 70 of the molding apparatus 50 descends further. As a result, the damper mechanisms of the strut members 64 operate, and the work supporting members 63 are pressed by the bottoms of the horizontal portions 73 of the upper mold 70, and descend to a predetermined first height from the base portion 61 of the lower mold 60. The moveable mold 80 thereby reaches a bottom dead point, and then molds the work W between the bottom surface of the moveable mold 80 and the central portion of the lower mold 60. At this time, there is no substantial change in the relative positional relationship between the upper mold 70 and the moveable mold 80.

Figure 17:
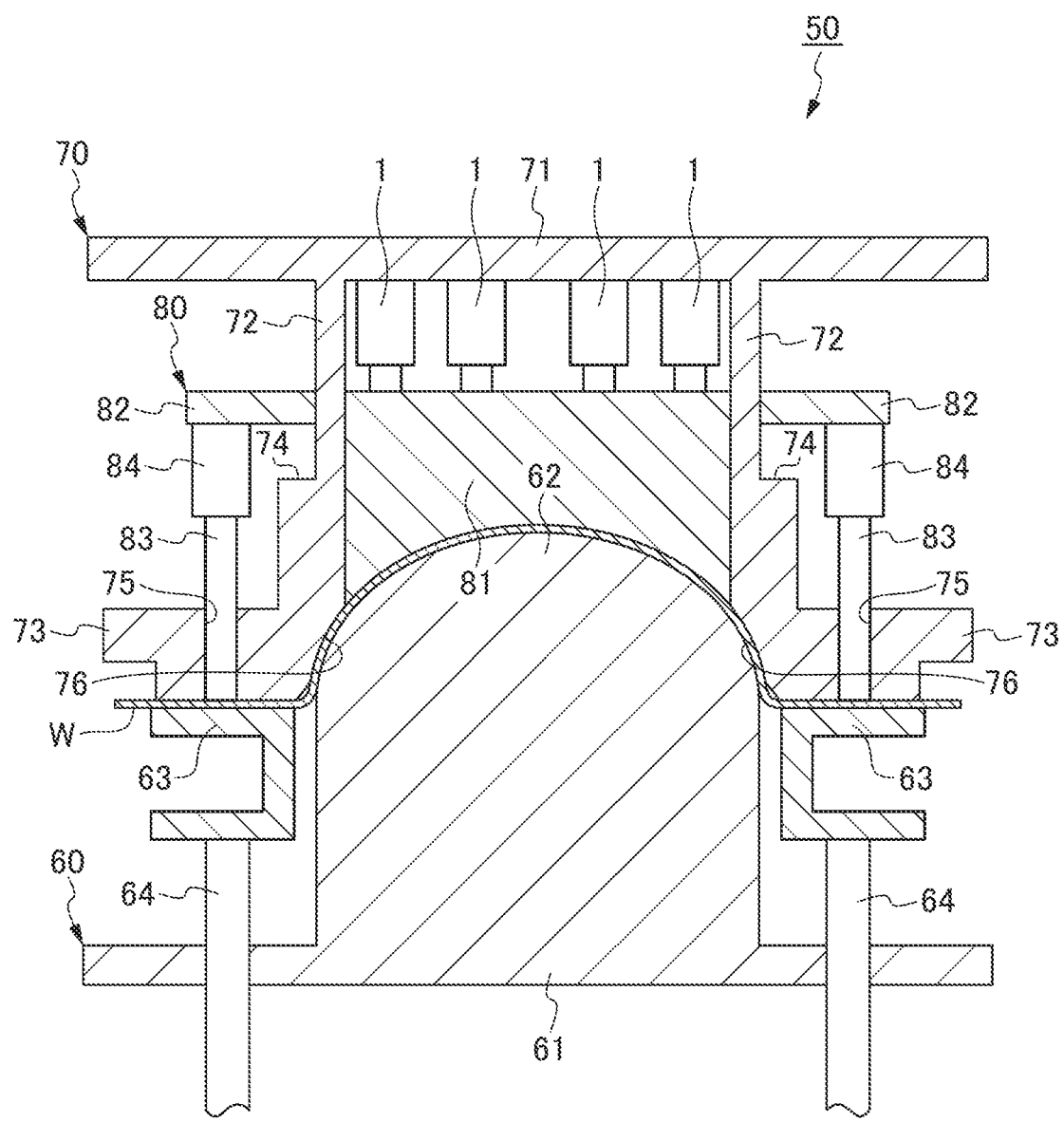
FIG. 17 is a longitudinal sectional view of main parts showing a state in which the upper mold of the molding apparatus has descended further, and the upper mold has reached a bottom dead point while the work supporting members descend further.

As shown in FIG. 17, when the upper mold 70 of the molding apparatus 50 descends further, the damper mechanisms of the strut members 64 operate further, and thus the work supporting members 63 are pressed by the bottoms of the horizontal portions 73 of the upper mold 70, and descend further to a predetermined second height from the base portion 61 of the lower mold 60. At this time, the moveable mold 80 cannot descend. As a result, the lower ends of the pistons 20 of the fluid cylinder mechanisms 1 are pressed to the top surface of the moveable mold 80, and the pistons 20 rise relative to the cylinders 10. The upper mold 70 thereby reaches a bottom dead point, and molds the work W between the bottom surface of the upper mold 70 and both side portions of the lower mold 60. At this time, the displacement rods 83 extend to an intermediate length.

Figure 18:
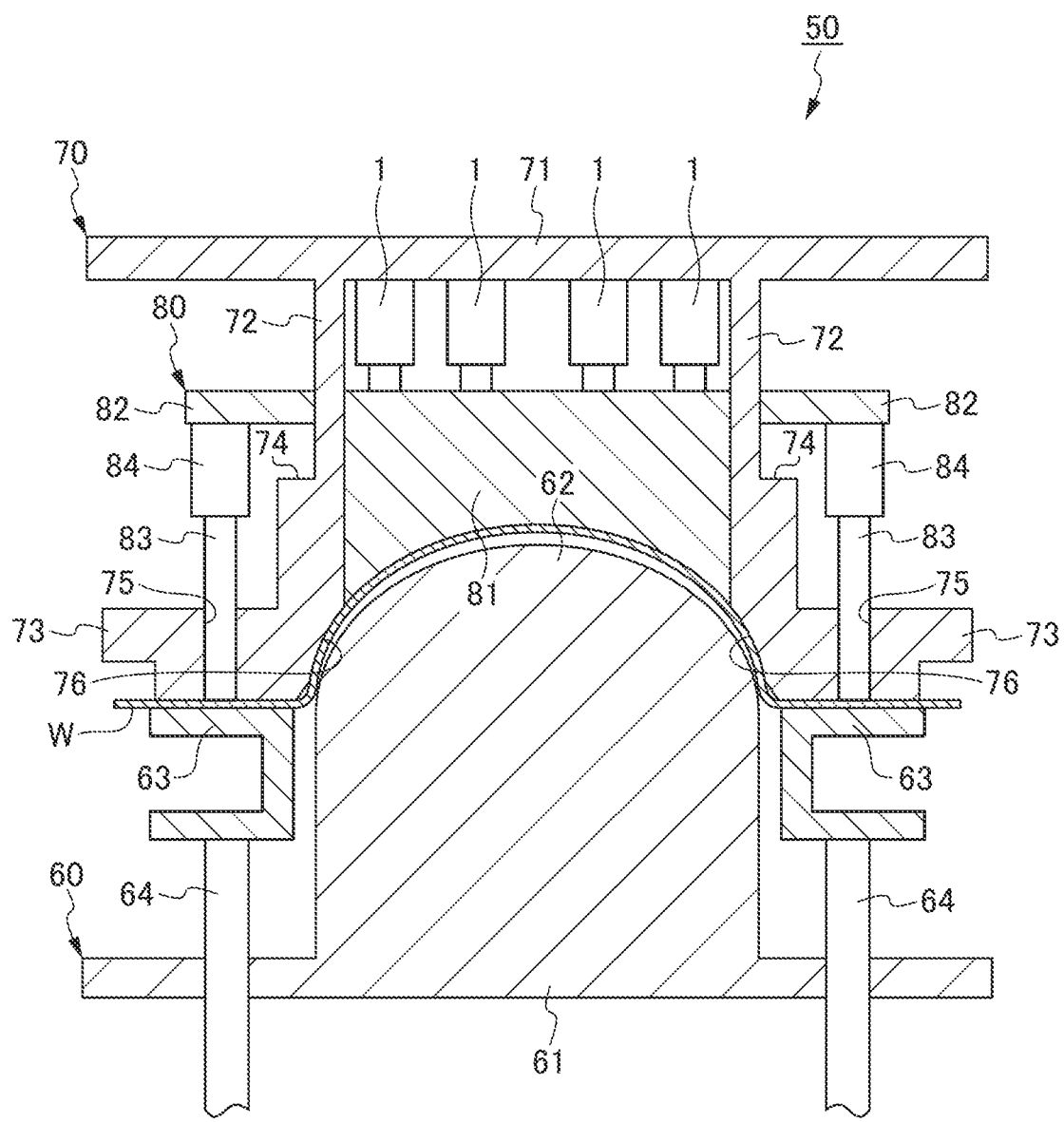
FIG. 18 is a longitudinal sectional view of main parts showing a state in which the piston of the fluid cylinder mechanism is in the locking state, and the upper mold of the molding apparatus has begun to rise, separating the work from the lower mold.

As shown in FIG. 18, when the upper mold 70 of the molding apparatus 50 slightly rises, the pistons 20 of the fluid cylinder mechanisms 1 enter a locking state remaining drawn inside the cylinders 10, and do not press the top surface of the moveable mold 80 downward. As a result, the upper mold 70 rises maintaining a state in which there is no substantial change in the relative positional relationship between the upper mold 70 and the moveable mold 80. At this time, the work supporting members 63 rise only by the raised amount of the upper mold 70. The work is thereby released from the lower mold 60 without being pressed back to the molding portion 81.

Figure 19:
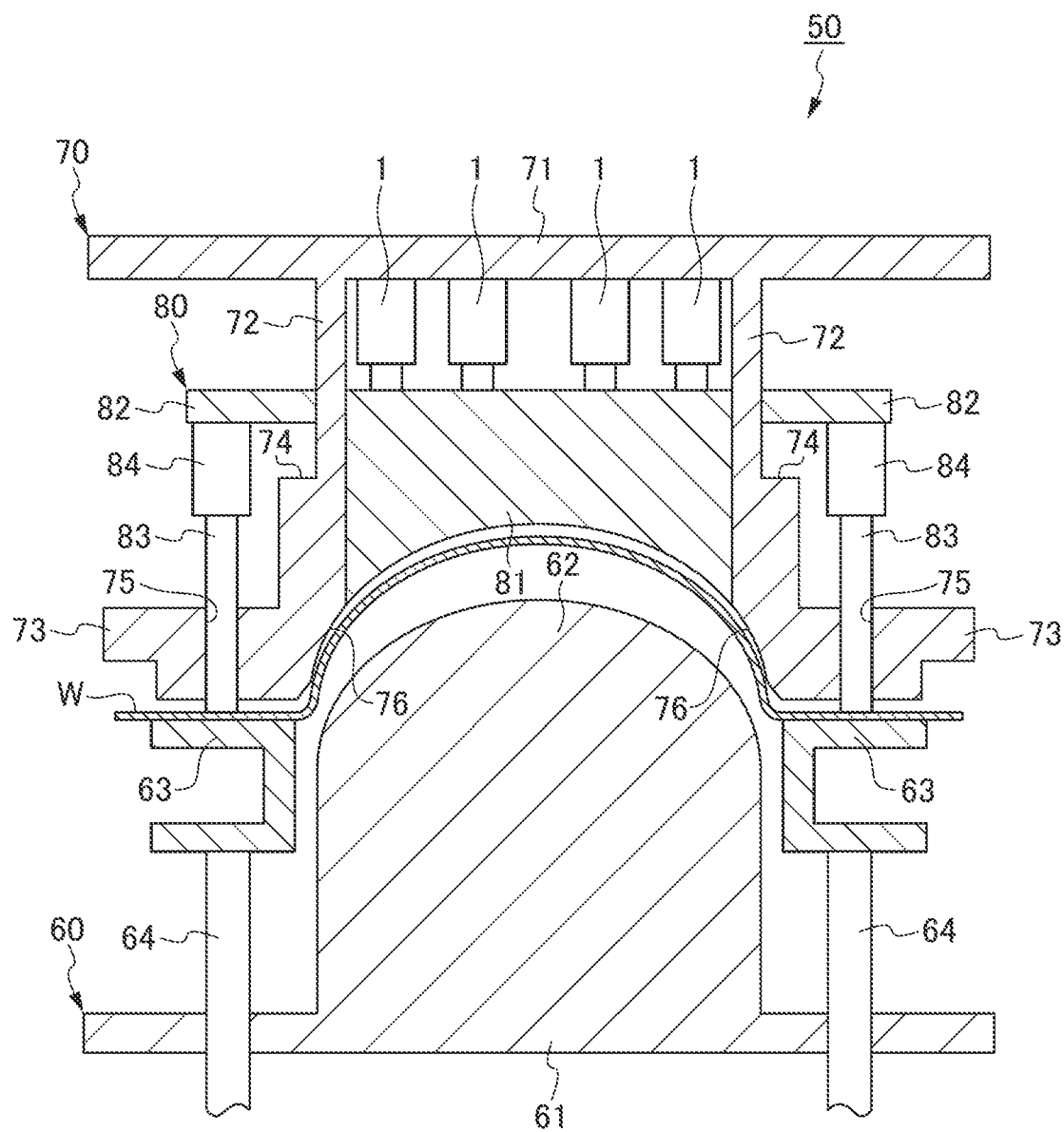
FIG. 19 is a longitudinal sectional view of main parts showing a state in which the piston of the fluid cylinder mechanism is in the locking state, and the upper mold of the molding apparatus has risen further, separating the work from the moveable mold and the upper mold.

As shown in FIG. 19, when the upper mold 70 of the molding apparatus 50 rises further, the work supporting members 63 rise up to the initial predetermined height from the base portion 61 of the lower mold 60. Thereafter, the displacement rods 83 extend to the initial predetermined length. As a result, the lower ends of the displacement rods 83 project downwards from the horizontal portions 73 of the upper mold 70. The central portion and both side portions of the work W are thereby simultaneously released from the moveable mold 80 and the moveable mold 80, respectively. At this time, the pistons 20 of the fluid cylinder mechanisms 1 are retained in the locking state.

Figure 20:
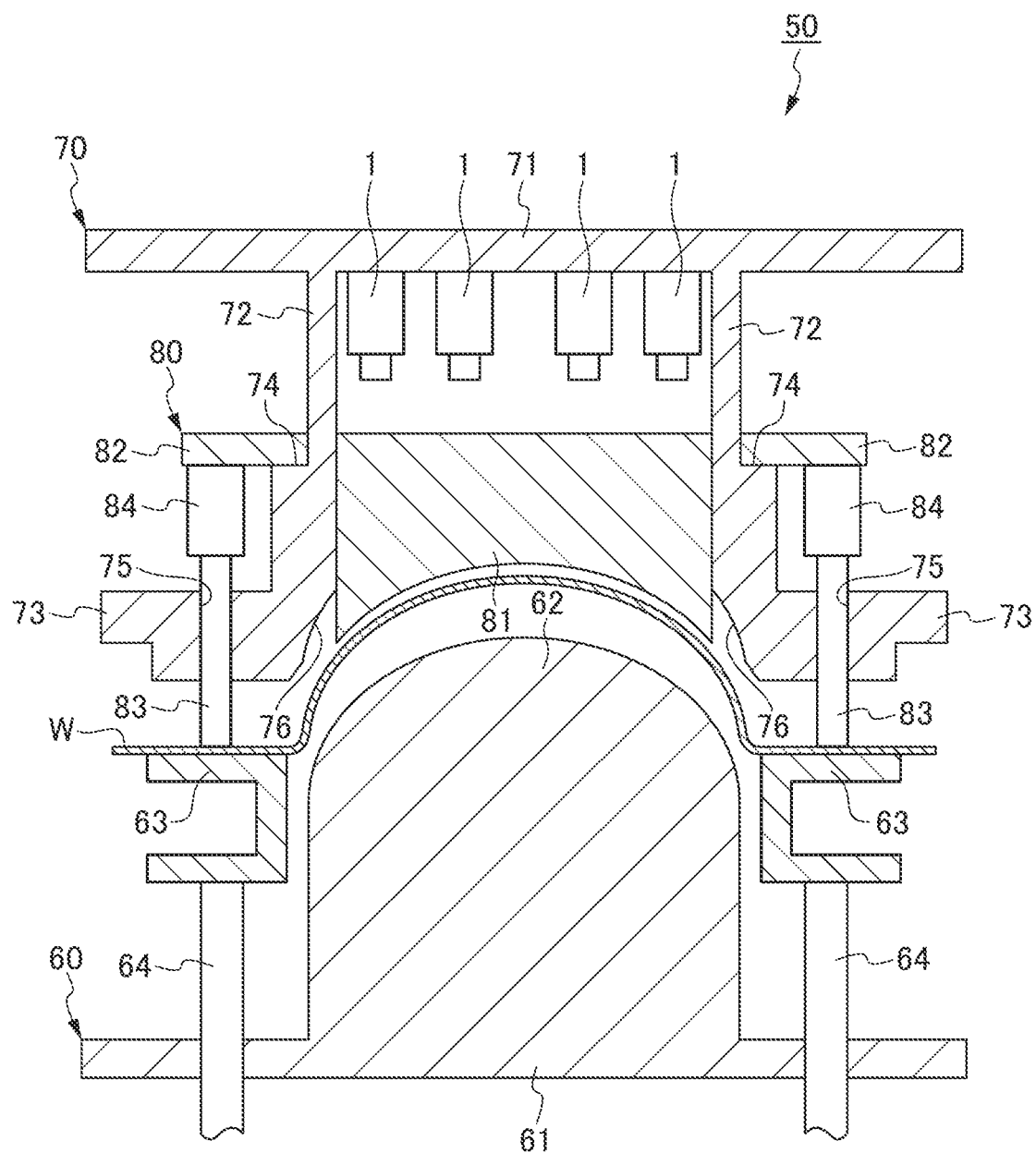
FIG. 20 is a longitudinal sectional view of main parts showing a state in which the upper mold of the molding apparatus has risen further, releasing the locking state of the piston of the fluid cylinder mechanism.

As shown in FIG. 20, when the upper mold 70 of the molding apparatus 50 rise further, the lower ends of the pistons 20 of the fluid cylinder mechanisms 1 separate from the top surface of the moveable mold 80, since the moveable mold 80 does not rise from the position shown in FIG. 19. Thereafter, the locking of the pistons 20 of the fluid cylinder mechanisms 1 is released. FIG. 20 shows a state prior to the locking of the pistons 20 of the fluid cylinder mechanisms 1 being released. FIG. 20 shows the position at which the support portions 74 of the upper mold 70 have risen to a height supporting the moveable mold 80 resting thereon, following rising of the upper mold 70 of the molding apparatus 50.

Thereafter, the upper mold 70 of the molding apparatus 50 rises further, and returns to the position shown in FIG. 12. By this time, the locking of the pistons 20 of the fluid cylinder mechanisms 1 has been released, and the pistons 20 thus return to their original positions projecting downwards from the cylinders 10. In other words, all of the lower mold 60, upper mold 70, moveable mold 80, and the fluid cylinder mechanisms 1 return to their respective positions shown in FIG. 12.

The effects of the first embodiment are as follows.

(1) When the pressure of the first pressurized chamber 14 rises due to the piston 20 receiving an external force and operating in a direction drawing into the cylinder 10, the pressure of the second pressurized chamber 15 also rises due to the fluid in the first pressurized chamber 14 flowing to the second pressurized chamber 15 through the first flow path 22.

When the external force causing the piston 20 to operate is released in a state in which the pressure of the second pressurized chamber 15 has risen to a predetermined level, return movement of the piston 20 can be suppressed by the pressure of the second pressurized chamber 15, and the piston 20 enters the locking state.

Consequently, in the locking state, it is possible to securely maintain the piston 20 at a position not substantially changed from the position drawn into the cylinder 10.

(2) When the pressure of the first pressurized chamber 14 rises due to the piston 20 operating in a direction drawn into the cylinder 10, the fluid in the first pressurized chamber 14 has potential to flow to the second pressurized chamber 15 through the first flow paths 22. At this time, the check valves 23 permit flow of this fluid. As a result, when the pressure of the first pressurized chamber 14 has risen, the fluid in the first pressurized chamber 14 can automatically flow to the second pressurized chamber 15 through the first flow paths 22.

Consequently, the structure of the first flow paths 22 can be configured very simply.

(3) The first communication paths 33 are formed in the rod portion 25 of the piston 20 to pass through a side wall thereof.

According to this configuration, it is unnecessary to carry out a difficult machining process on the rod portion 25 of the piston 20 along the axial direction thereof, and as a result, to form the outside diameter of the rod portion 25 to be larger so that the wall thickness of the rod portion 25 of the piston 20 is thicker, or to configure the outside diameter of the entire fluid cylinder mechanism 1 to be larger, for example.

Therefore, it is possible to configure the outside diameter dimension of the fluid cylinder mechanism 1 to be small.

(4) It is possible for the switch rod 37 to make the second flow path 32 open and close via the valve mechanism 36 in response to the switch end 38 of the switch rod 37 projecting and retracting from the penetrating hole 29 of the rod portion 25 of the piston 20. Specifically, when the switch end 38 of the switch rod 37 projects from the penetrating hole 29 of the rod portion 25, the valve mechanism 36 opens the second communication path 34, and when the switch end 38 of the switch rod 37 immerses into the penetrating hole 29 of the rod portion 25, the valve mechanism 36 blocks the second communication path 34.

Consequently, it is possible to configure an opening and closing structure of the second flow path 32 very simply.

Second Embodiment

Figure 11:
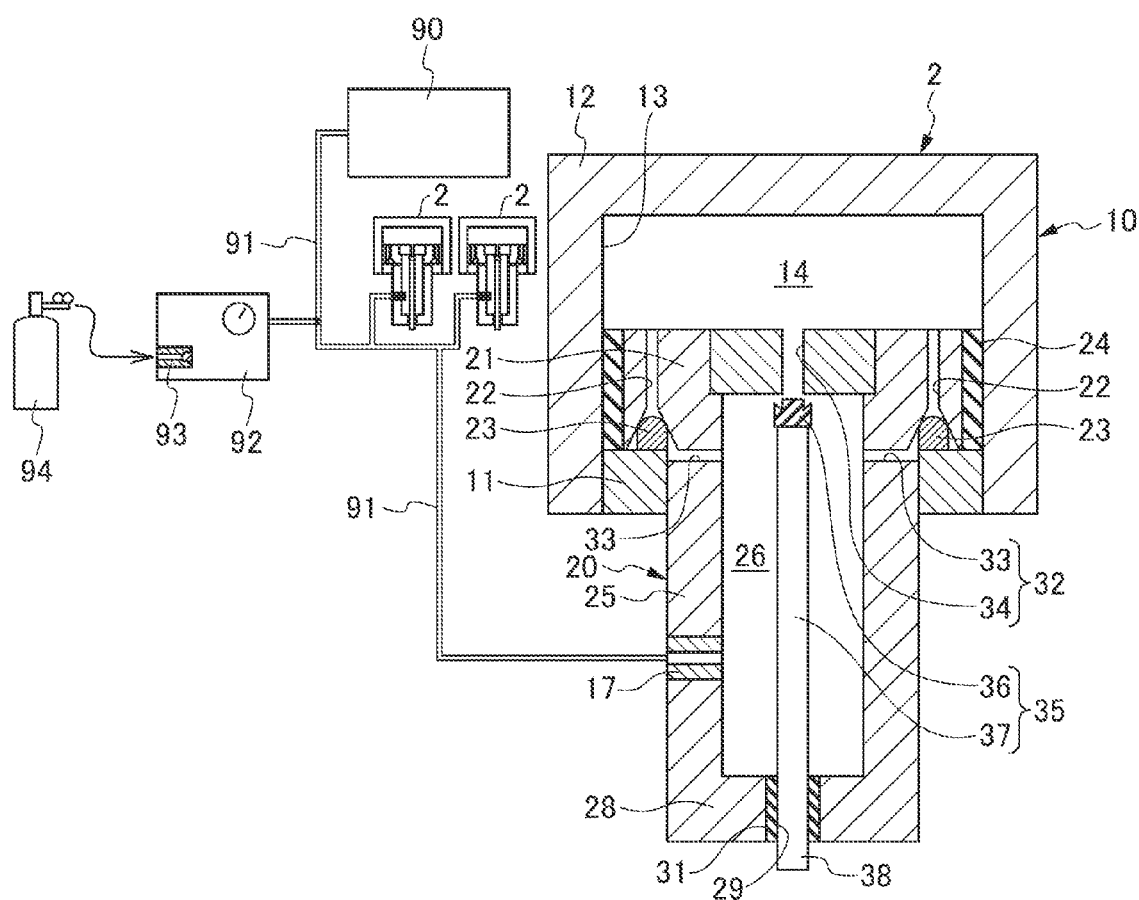
FIG. 11 is a schematic longitudinal sectional view showing a fluid cylinder mechanism according to a second embodiment of the present invention.

FIG. 11 is a schematic longitudinal cross sectional view showing a fluid cylinder mechanism 2 according to a second embodiment of the present invention.

The points of difference between this fluid cylinder mechanism 2 and the fluid cylinder mechanism 1 according to the first embodiment are in the installation positions of the feed path 16 and the supply pipe 17. There are no other differences between the fluid cylinder mechanism 2 and the fluid cylinder mechanism 1. Therefore, each part of the fluid cylinder mechanism 2 is indicated using the same reference symbols used for the fluid cylinder mechanism 1.

In the case of the fluid cylinder mechanism 1, the feed path 16 is formed in the cylinder 10 in a side thereof at a base end 12, and the supply pipe 17, which is equipped with the check valve 18 at a leading end thereof, is installed in this feed path 16. In this case, the operating air is fed to the first pressurized chamber 14 via the feed path 16.

In contrast, in the case of the fluid cylinder mechanism 2, the supply pipe 17 is installed in a side wall of the rod portion 25 of the piston 20. In this case, the operating air is fed to the internal space 26 of the piston 20 via the supply pipe 17.

The supply pipe 17 is connected to a compressed gas tank 90 via plumbing 91. A gas injection part 92 is connected to the plumbing 91. Gas is injected from a compressed gas cylinder 94 to the gas injection part 92 through a valve 93

The fluid cylinder mechanism 2 has the following characteristics.

It is unnecessary to form a feed path 16 in the fluid cylinder mechanism 2 itself. In other words, the feed path 16 is not formed in the cylinder 10 in a side thereof at the base end 12, nor is the supply pipe 17 installed thereto. As a result, the configuration of the cylinder 10 on a side thereof at the base end becomes simple, whereby the overall height of the fluid cylinder mechanism 2 can be kept low.

It is easy to make the volume of the internal space 26 of the piston 20 larger than the first pressurized chamber 14. As a result, the fluid cylinder mechanism 2 can be directly connected to the compressed gas tank 90 by connecting the supply pipe 17 to the plumbing 91. The amount of volume change in the fluid cylinder mechanism 2 is thereby kept small, whereby a sudden pressure rise is prevented.

The plumbing 91 can not only directly connect the fluid cylinder mechanism 2 to the compressed gas tank 90, but also can plumb together with one individual or a plurality of the fluid cylinder mechanisms 2.

In addition to the above-mentioned effects, the second embodiment has the following effects.

(5) The feed path 16 and supply pipe 17 are not provided in the cylinder 10 on a side thereof at the base end 12. As a result, the configuration of the cylinder 10 on the side thereof at the base end 12 becomes simple. Therefore, the overall height of the fluid cylinder mechanism 2 can be kept short.

(6) It is relatively easy to enlarge the volume of the internal space 26 of the piston 20. As a result, the fluid cylinder mechanism 2 can be directly connected to the compressed gas tank 90 by connecting the supply pipe 17 to the plumbing 91. Consequently, the amount of volume change in the fluid cylinder mechanism 2 can be kept small, whereby a sudden pressure rise can be prevented.

(7) The plumbing 91 can not only directly connect the fluid cylinder mechanism 2 to the compressed gas tank 90, but can also plumb together with one individual or a plurality of fluid cylinder mechanisms 2.

What is claimed is:

1. A fluid cylinder mechanism including a cylinder having a base end and an open end, and a piston having a flange portion disposed inside of the cylinder and a rod portion that passes through the open end of the cylinder, a space inside the cylinder being partitioned by the flange portion of the piston into a first pressurized chamber on a side thereof at the base end and a second pressurized chamber on a side thereof at the open end, the mechanism comprising:

a first flow path that only permits flow of a one-way fluid from the first pressurized chamber to the second pressurized chamber;

a second flow path that permits flow of a fluid from the second pressurized chamber to the first pressurized chamber; and a device for opening and closing the second flow path, wherein in a state in which the second flow path is blocked by the device, in response to the piston operating so as to raise an internal pressure of the first pressurized chamber, an internal pressure of the second pressurized chamber rises similarly due to the flow of the one-way fluid, and when the operation of the piston is released, a return movement of the piston is suppressed due to the raised internal pressure of the second pressurized chamber.

2. The fluid cylinder mechanism according to claim 1, wherein the first flow path includes a check valve that permits flow of a fluid from the first pressurized chamber to the second pressurized chamber, following compression of the fluid inside the first pressurized chamber due to operation of the piston.

3. The fluid cylinder mechanism according to claim 2, wherein the piston has an internal space, wherein the first flow path is provided in the flange portion of the piston, and wherein the second flow path includes:

a first communication path that passes through a side wall of the rod portion of the piston and communicates the second pressurized chamber with the internal space; and a second communication path that communicates the internal space of the piston with the first pressurized chamber.

4. The fluid cylinder mechanism according to claim 3,
wherein the device includes:
a valve mechanism that opens and closes the second flow path in the internal space of the piston; and
a switch member that is slidable along an axial direction of the rod portion in the internal space of the piston, and has a first end and a second end, the second end causing the valve mechanism to open and close in response to protrusion and retraction of the first end from an end of the rod portion.

5. The fluid cylinder mechanism according to claim 1,
wherein the piston has an internal space,
wherein the first flow path is provided in the flange portion of the piston, and
wherein the second flow path includes:
a first communication path that passes through a side wall of the rod portion of the piston and communicates the second pressurized chamber with the internal space; and
a second communication path that communicates the internal space of the piston with the first pressurized chamber.

6. The fluid cylinder mechanism according to claim 5,
wherein the device includes:
a valve mechanism that opens and closes the second flow path in the internal space of the piston; and
a switch member that is slidable along an axial direction of the rod portion in the internal space of the piston, and has a first end and a second end, the second end causing the valve mechanism to open and close in response to protrusion and retraction of the first end from an end of the rod portion.

* * * * *